US012647396B2

(12) United States Patent　　　　(10) Patent No.: US 12,647,396 B2
Patnala et al.　　　　　　　　　　(45) Date of Patent:　　　Jun. 2, 2026

(54) INVENTORY MONITORING FOR CLOUD RESOURCE PROTECTION IN REAL TIME

(71) Applicant: Cisco Technology, Inc., San Jose, CA (US)

(72) Inventors: Praveen Kumar Patnala, Santa Clara, CA (US); Ganesh Narayanaswamy, Sunnyvale, CA (US); Shaobo Liu, Broomfield, CO (US); Mark Landgrebe, Marina Del Rey, CA (US); Vijay Chander, San Ramon, CA (US); Vishal Jain, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 59 days.

(21) Appl. No.: 18/626,287

(22) Filed: Apr. 3, 2024

(65) Prior Publication Data

US 2025/0193249 A1　　　Jun. 12, 2025

Related U.S. Application Data

(60) Provisional application No. 63/609,196, filed on Dec. 12, 2023.

(51) Int. Cl.
H04L 9/40　　　　(2022.01)
G06F 12/0802　　(2016.01)
(Continued)

(52) U.S. Cl.
CPC ...... H04L 63/0263 (2013.01); G06F 12/0802 (2013.01); H04B 10/25 (2013.01);
(Continued)

(58) Field of Classification Search
CPC . H04L 41/0894; H04L 47/726; H04L 47/785; H04L 63/10; H04L 63/0227;
(Continued)

(56) References Cited

U.S. PATENT DOCUMENTS

| | | | |
|---|---|---|---|
| 11,416,563 B1 * | 8/2022 | Spagnolo | ................ G06F 16/27 |
| 2015/0081882 A1 * | 3/2015 | Bartucca | ............... H04L 47/785 |
| | | | 709/224 |

(Continued)

FOREIGN PATENT DOCUMENTS

| | | |
|---|---|---|
| CN | 114697189 A | 7/2022 |
| WO | 2023212388 A1 | 11/2023 |

OTHER PUBLICATIONS

International Search Report and Written Opinion for International Application No. PCT/US2024/059828, mailed Feb. 14, 2025, 12 Pages.

*Primary Examiner* — Dustin Nguyen
(74) *Attorney, Agent, or Firm* — Polsinelli P.C.

(57)　　　　　ABSTRACT

Disclosed are systems, apparatuses, methods, and computer-readable media for inventory monitoring in a multi-cloud network environment. A method includes receiving user input via a controller's interface, wherein the input includes first account information granting access to a first virtual private cloud and a second virtual private cloud, both hosted by a cloud service provider (CSP). The controller queries the first and second virtual private clouds using the respective account information and the CSP's APIs to identify resources, gathering them into an inventory, and maintains a mapping of tags to the resources, associating each tag with a specific security policy. The controller forwards a first subset of tag-resource mappings to a first security gateway in the first virtual private cloud, enabling automatic application of corresponding security policies upon instantiation of tagged resources.

20 Claims, 13 Drawing Sheets

(51) Int. Cl.

| | |
|---|---|
| *H04B 10/25* | (2013.01) |
| *H04L 9/08* | (2006.01) |
| *H04L 9/32* | (2006.01) |
| *H04L 41/16* | (2022.01) |
| *H04L 67/1008* | (2022.01) |
| *H04Q 11/00* | (2006.01) |
| *G06F 16/23* | (2019.01) |
| *G06F 16/27* | (2019.01) |

(52) U.S. Cl.
CPC .......... *H04L 9/0861* (2013.01); *H04L 9/3242* (2013.01); *H04L 9/3247* (2013.01); *H04L 41/16* (2013.01); *H04L 63/0227* (2013.01); *H04L 63/0236* (2013.01); *H04L 63/083* (2013.01); *H04L 63/10* (2013.01); *H04L 63/1416* (2013.01); *H04L 63/1425* (2013.01); *H04L 63/145* (2013.01); *H04L 63/20* (2013.01); *H04L 67/1008* (2013.01); *H04Q 11/0066* (2013.01); *G06F 16/2365* (2019.01); *G06F 16/27* (2019.01); *H04L 63/166* (2013.01)

(58) Field of Classification Search
CPC ............. H04L 63/1433; H04L 67/1001; H04L 12/4633; H04L 41/40; H04L 63/102; H04L 63/105; G06F 9/451; G06F 9/5072; G06F 16/27; G06F 21/604
See application file for complete search history.

(56) References Cited

U.S. PATENT DOCUMENTS

| | | | |
|---|---|---|---|
| 2015/0200958 A1* | 7/2015 | Muppidi ............. | H04L 63/1433 726/23 |
| 2017/0201569 A1 | 7/2017 | Fu et al. | |
| 2019/0028456 A1* | 1/2019 | Kurian ................... | H04L 63/10 |
| 2020/0007501 A1 | 1/2020 | Jain et al. | |
| 2020/0059420 A1 | 2/2020 | Abraham | |
| 2020/0177591 A1* | 6/2020 | Pogrebinsky ......... | G06F 9/5072 |
| 2021/0044542 A1* | 2/2021 | Goyal ................... | H04L 47/726 |
| 2021/0111965 A1 | 4/2021 | Kandaswamy et al. | |
| 2021/0409486 A1* | 12/2021 | Martinez ............. | H04L 67/1001 |
| 2022/0046061 A1* | 2/2022 | Janakiraman ....... | H04L 41/0894 |
| 2023/0244505 A1* | 8/2023 | Hernandez Serrano .................... | G06F 9/451 715/744 |
| 2024/0171573 A1* | 5/2024 | Bolisetti ............... | H04L 63/105 |
| 2024/0179070 A1* | 5/2024 | Zhou ....................... | H04L 41/40 |
| 2025/0124150 A1* | 4/2025 | Sun ....................... | G06F 21/604 |
| 2025/0141931 A1* | 5/2025 | Sanghvi .............. | H04L 63/0227 |
| 2025/0193201 A1* | 6/2025 | Lin ....................... | H04L 63/102 |
| 2025/0317407 A1* | 10/2025 | Zhu ..................... | H04L 12/4633 |

* cited by examiner

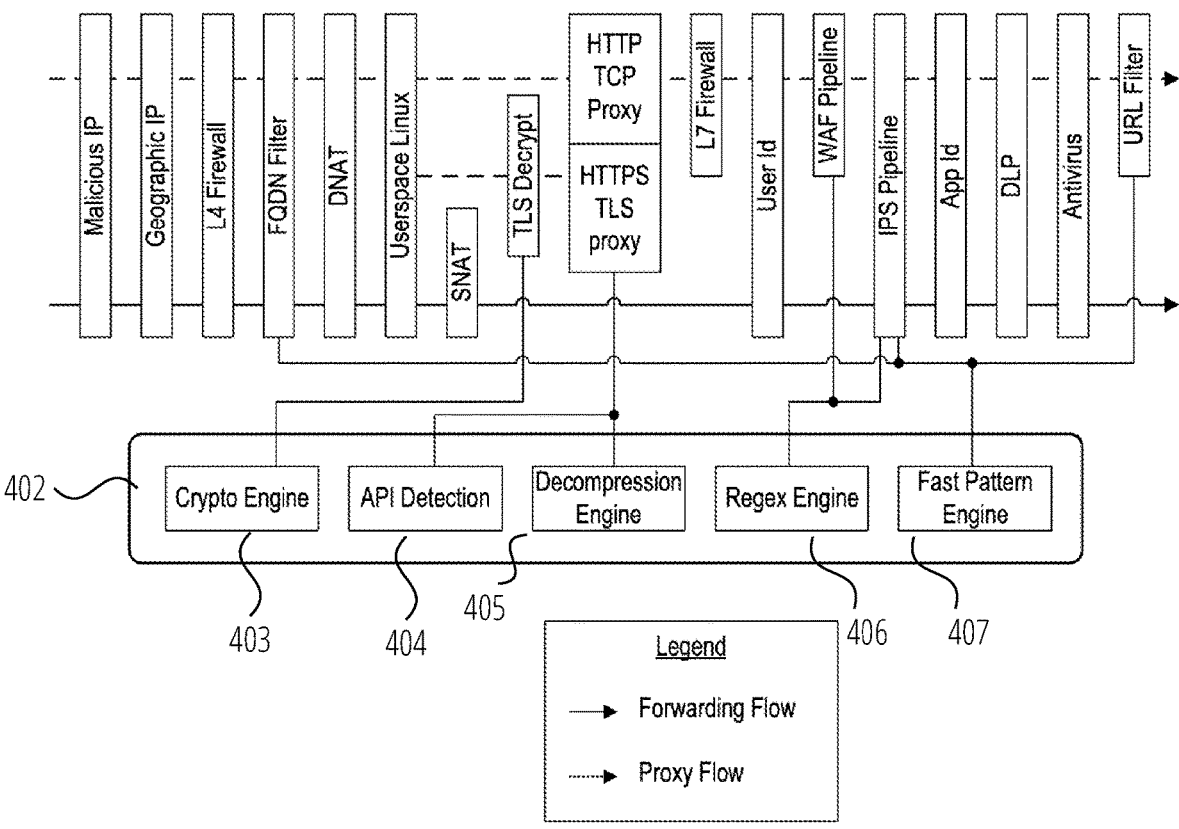
FIG. 4

Addresses: 85

Filter

Name

CSP Acct

Region

| Name | Category | Type |
|---|---|---|
| web1-application | Reverse Proxy Tar. | Dynamic_AP |
| web1-application | Forward Proxy Tar. | Dynamic_AP |
| web1-api | Firewall | API |
| web2-application | Forward Proxy Tar. | Dynamic_AP |
| web2-application | Reverse Proxy Tar. | Dynamic_AP |
| internal-app | Forward Proxy Tar. | Dynamic_AP |
| internal-app | Reverse Proxy Tar. | Dynamic_AP |
| notifications | security | other |
| VPN-app1 | Firewall | RPC |

Associated Policy Rule Sets

Associated Policy Rule Sets
valtix-app-ingress

Associated Services
app1
app2

Sub Objects

| Name | Type | CSP Acct | VPC/VNet |
|---|---|---|---|
| 10.0.1.6 | IP_ADDR | azure-user | rng-web-vnet |
| 10.0.2.3 | IP_ADDR | gcp-user | prod-gcp-vpc |
| 20.120.192.71 | IP_ADDR | azure-user | rng-web-vnet |
| web1-lbaad71.us-west-2.aws.com | FQDN | aws-user | vpc-af81d19 |

FIG. 8

Figure 9:
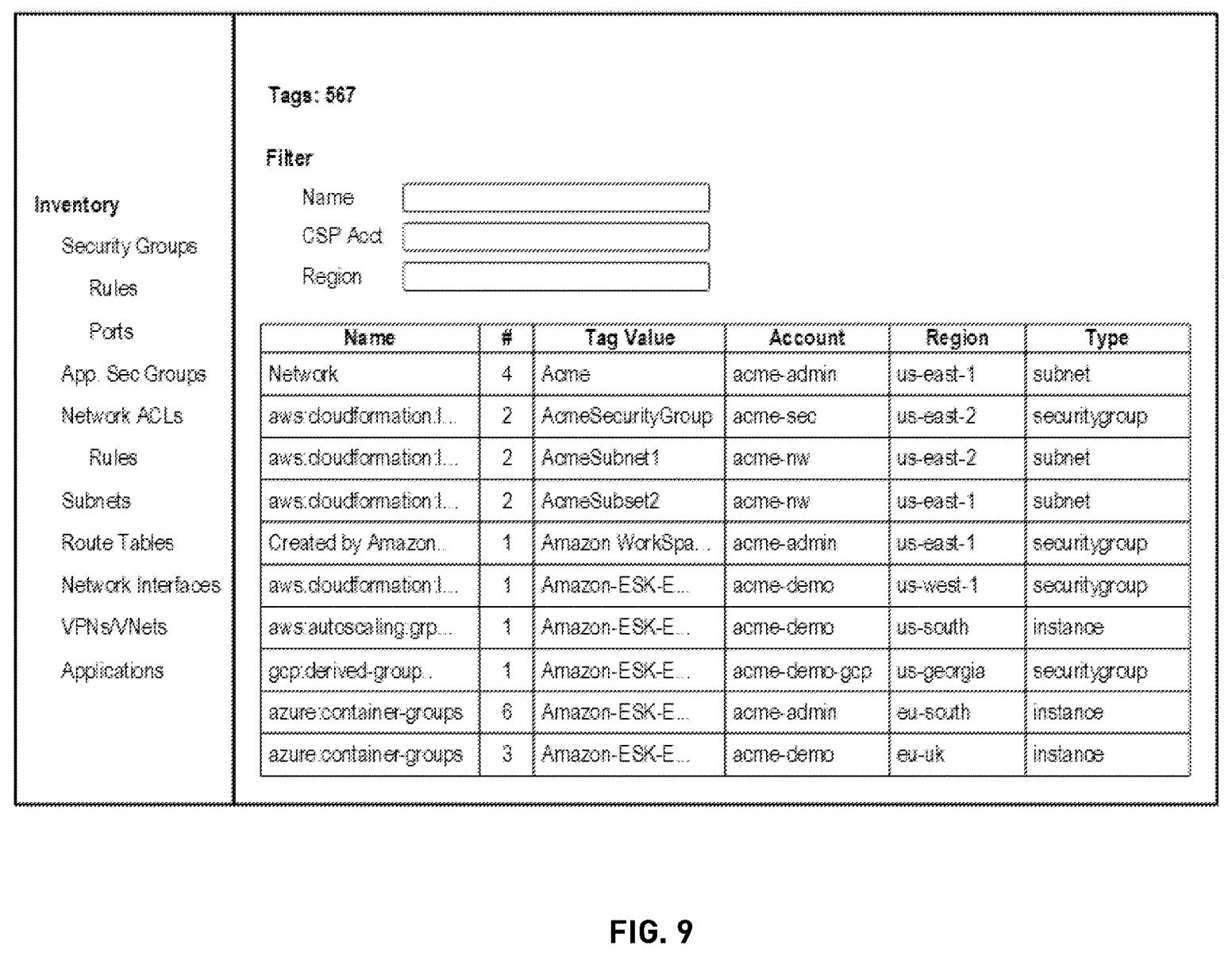

Tags : 567

Filter

| Name |
| CSP Acct |
| Region |

Inventory

Security Groups
  Rules
  Ports
App. Sec Groups
Network ACLs
  Rules
Subnets
Route Tables
Network interfaces
VPNs/VNets
Applications

| Name | # | Tag Value | Account | Region | Type |
|---|---|---|---|---|---|
| Network | 4 | Acme | acme-admin | us-east-1 | subnet |
| aws:cloudformation:l... | 2 | AcmeSecurityGroup | acme-sec | us-east-2 | securitygroup |
| aws:cloudformation:l... | 2 | AcmeSubnet1 | acme-nw | us-east-2 | subnet |
| aws:cloudformation:l... | 2 | AcmeSubset2 | acme-nw | us-east-1 | subnet |
| Created by Amazon... | 1 | Amazon WorkSpa... | acme-admin | us-east-1 | securitygroup |
| aws:cloudformation:l... | 1 | Amazon-ESK-E... | acme-demo | us-west-1 | securitygroup |
| aws:autoscaling:grp... | 1 | Amazon-ESK-E... | acme-demo | us-south | instance |
| grp-derived-group... | 1 | Amazon-ESK-E... | acme-demo-grp | us-georgia | securitygroup |
| azure:container-groups | 6 | Amazon-ESK-E... | acme-admin | eu-south | instance |
| azure:container-groups | 3 | Amazon-ESK-E... | acme-demo | eu-uk | instance |

Figure 11:
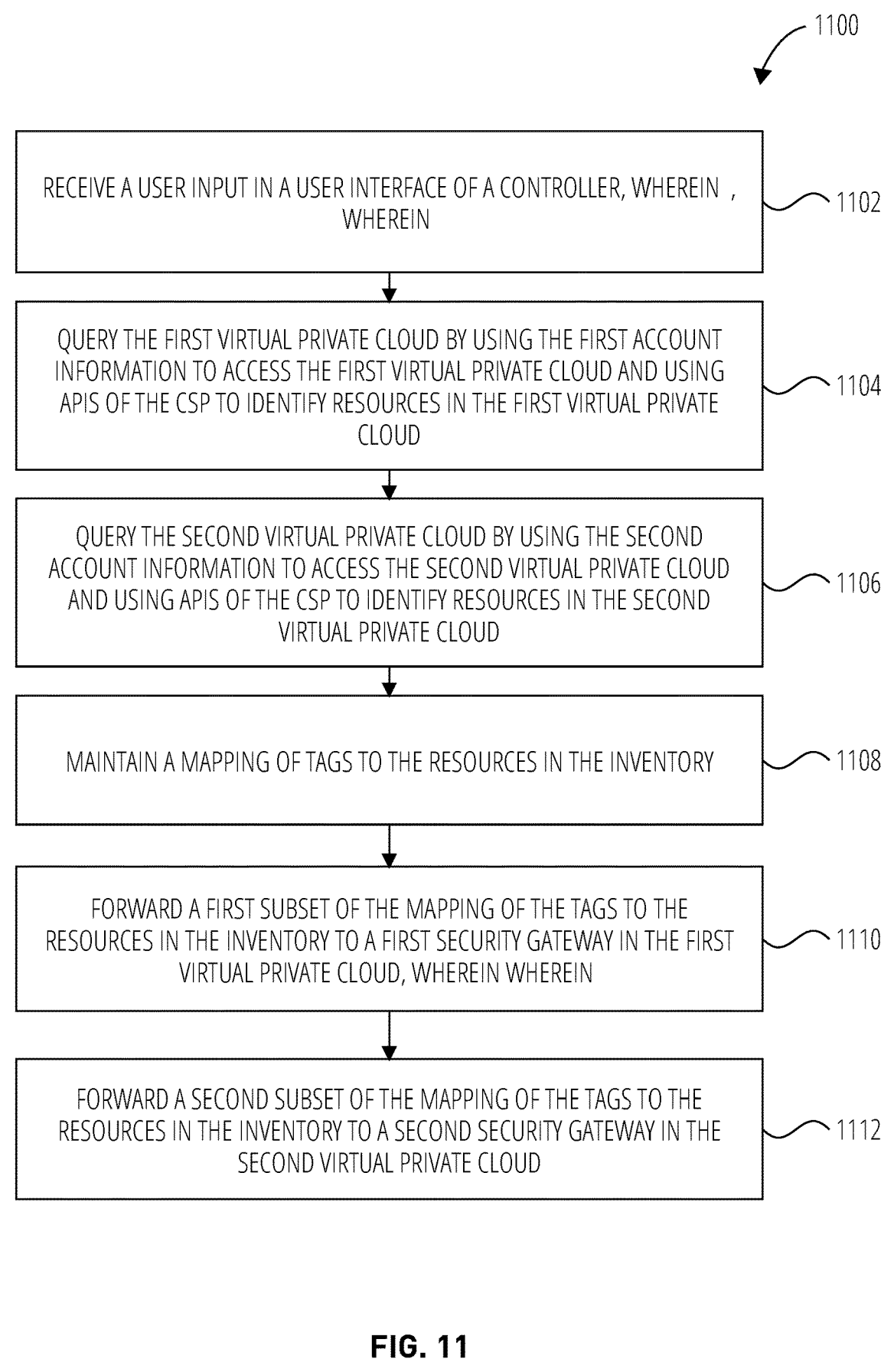

RECEIVE A USER INPUT IN A USER INTERFACE OF A CONTROLLER, WHEREIN , WHEREIN    ~1102

QUERY THE FIRST VIRTUAL PRIVATE CLOUD BY USING THE FIRST ACCOUNT INFORMATION TO ACCESS THE FIRST VIRTUAL PRIVATE CLOUD AND USING APIS OF THE CSP TO IDENTIFY RESOURCES IN THE FIRST VIRTUAL PRIVATE CLOUD    ~1104

QUERY THE SECOND VIRTUAL PRIVATE CLOUD BY USING THE SECOND ACCOUNT INFORMATION TO ACCESS THE SECOND VIRTUAL PRIVATE CLOUD AND USING APIS OF THE CSP TO IDENTIFY RESOURCES IN THE SECOND VIRTUAL PRIVATE CLOUD    ~1106

MAINTAIN A MAPPING OF TAGS TO THE RESOURCES IN THE INVENTORY    ~1108

FORWARD A FIRST SUBSET OF THE MAPPING OF THE TAGS TO THE RESOURCES IN THE INVENTORY TO A FIRST SECURITY GATEWAY IN THE FIRST VIRTUAL PRIVATE CLOUD, WHEREIN WHEREIN    ~1110

FORWARD A SECOND SUBSET OF THE MAPPING OF THE TAGS TO THE RESOURCES IN THE INVENTORY TO A SECOND SECURITY GATEWAY IN THE SECOND VIRTUAL PRIVATE CLOUD    ~1112

RECEIVE A REQUEST TO CONFIGURE A FIREWALL IN A CLOUD SERVICE PROVIDER IN A MULTI-CLOUD DEPLOYMENT ⌇ 1202

IDENTIFY AND GENERATE SINGLE FIREWALL CONFIGURATION INFORMATION BASED ON THE NAME AND DIRECTION INCLUDED IN THE TAG ⌇ 1204

PROVIDE THE DERIVED FIREWALL INFORMATION TO THE SPECIFIC CLOUD SERVICE PROVIDER IN A MULTI-CLOUD DEPLOYMENT ⌇ 1206

INVENTORY MONITORING FOR CLOUD RESOURCE PROTECTION IN REAL TIME

CROSS-REFERENCE TO RELATED APPLICATIONS

This application claims the benefit of and priority to U.S. provisional application No. 63/609,196, filed on Dec. 12, 2023, entitled "FIBER-BASED ACCELERATION OF DATA PATH EXECUTION", which is expressly incorporated by reference herein in its entirety.

TECHNICAL FIELD

The disclosure relates generally to cloud networking and, more specifically but not exclusively, to systems and techniques for a single configuration for multi-cloud firewall deployment.

BACKGROUND

Public clouds are third-party, off-premises cloud platforms that deliver computing resources, such as virtual machines, storage, and applications, over the Internet. Services provided by public cloud providers, such as Amazon Web Services (AWS), Microsoft Azure, and Google Cloud Platform, are shared among multiple customers. Public clouds offer scalability, cost efficiency, and flexibility as organizations can access and pay for resources on a pay-as-you-go model. Pay-as-you-go is particularly beneficial for customers with fluctuating workloads and enables enterprises to scale resources up or down based on demand. However, the shared nature of public clouds raises considerations regarding security, compliance, and data privacy, and customers need to carefully evaluate their specific requirements and choose appropriate providers.

Many customers also have private clouds, which are dedicated infrastructure that is either on-premises or hosted by a third-party. Private clouds are designed exclusively for a single customer, providing greater control over resources and data. Private clouds are suitable for entities with stringent security and compliance requirements, allowing the entities to customize and manage the infrastructure according to specific needs. Entities use private clouds to retain control over business applications, sensitive data, or when regulatory compliance mandates demand a higher level of data governance.

Hybrid and multi-cloud approaches have become popular to adapt to the benefit of public and private clouds. Hybrid clouds allow organizations to enjoy the scalability of public clouds while retaining certain workloads in a private, more controlled environment. Multi-cloud strategies involve using services from multiple public cloud providers, offering redundancy, flexibility, and the ability to choose the best-suited services for specific tasks.

BRIEF DESCRIPTION OF THE SEVERAL VIEWS OF THE DRAWINGS

In order to describe the manner in which the above-recited and other advantages and features of the disclosure may be obtained, a more particular description of the principles briefly described above will be rendered by reference to specific embodiments thereof which are illustrated in the appended drawings. Understanding that these drawings depict exemplary embodiments of the disclosure and are not therefore to be considered to be limiting of its scope, the principles herein are described and explained with additional specificity and detail through the use of the accompanying drawings in which:

FIG. 4 illustrates a functional view of a data path pipeline and integration with hardware in accordance with various aspects of the disclosure.

FIG. 8 is an illustration of data objects that can be applied to enable a single configuration in a multi-cloud firewall deployment in accordance with various aspects of the disclosure.

FIG. 9 is an illustration of various rules that can applied to a cloud security provider in accordance with various aspects of the disclosure.

FIG. 11 illustrates an example routine for inventory monitoring in a multi-cloud network environment in accordance with various aspects of the disclosure.

DETAILED DESCRIPTION

Figure 1:
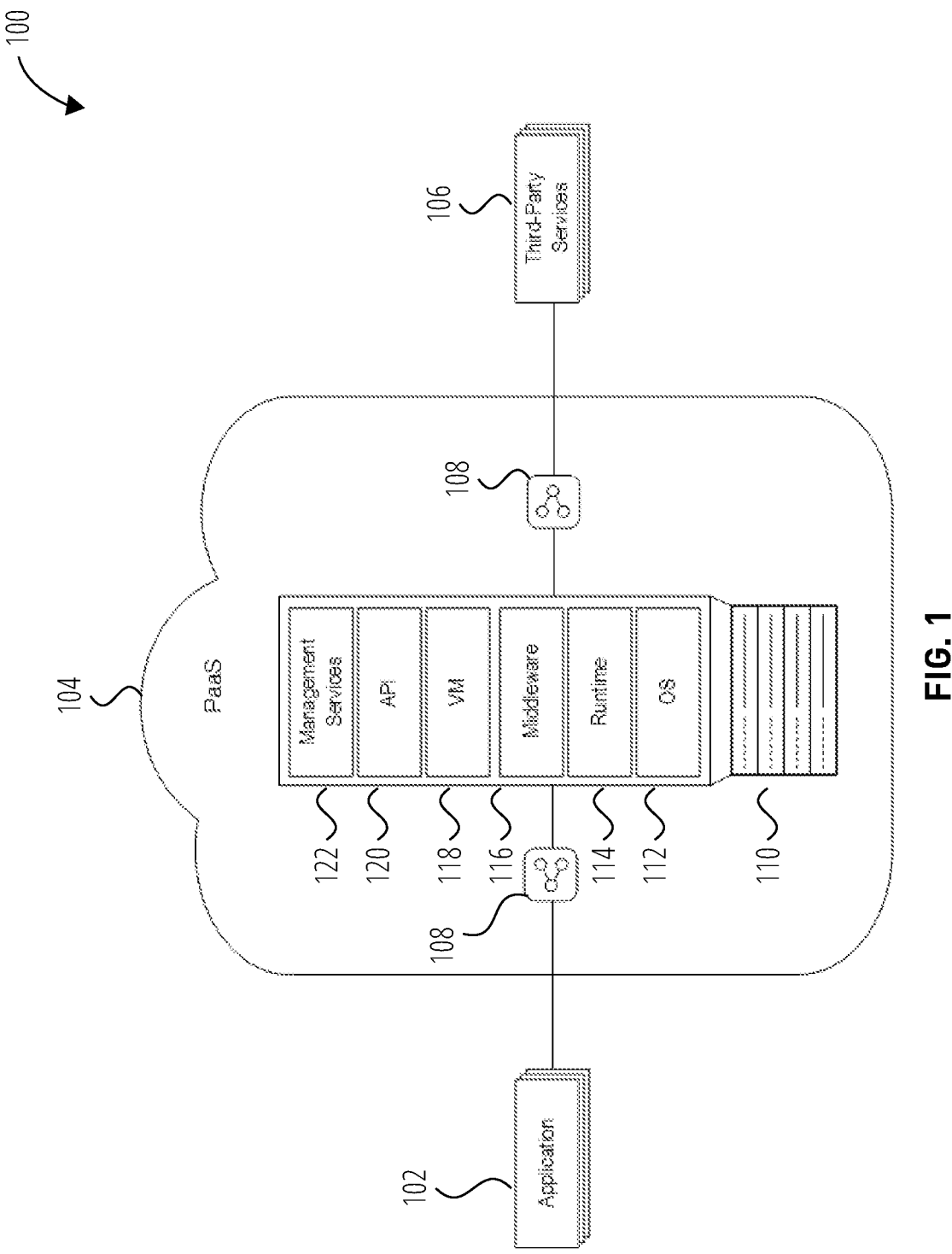
FIG. 1 is a conceptual diagram of a cloud security platform that to integrates into different cloud providers in accordance with various aspects of the disclosure.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure may be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims or may be learned by the practice of the principles set forth herein.

Overview

Cloud network providers include various companies such as Google, Apple, Amazon, Microsoft, DigitalOcean, Vercel, Alibaba, Netlify, Redhat OpenShift, Oracle, and many other entities. Each cloud provider offers a range of services, from foundational infrastructure, which is referred to Infrastructure as a Service (IaaS), platforms for application development and deployment, which is referred to as platform as a service (PaaS), and fully managed software applications, which is referred to as software as a service (Saas). Cloud providers maintain a network of geographically distributed data centers that host servers, storage, and networking equipment and allow customers to deploy resources in proximity to their target audience for improved performance and redundancy, including content delivery networks (CDN) and edge compute services.

Virtualization technology is a foundational aspect of cloud providers and enables the creation of virtual instances of servers, storage, and network resources within a geographic region. Cloud providers also deploy resource orchestration tools to manage the dynamic allocation and scaling of these virtual resources based on demand. Fundamentally, cloud providers establish robust, high-speed connections between their data centers and form a global network backbone. This backbone ensures low-latency communication and facilitates data transfer between different regions.

Conventional security within cloud providers deploy a range of security measures, including encryption, firewalls, identity and access management, and compliance certifications, to safeguard customer data and ensure the integrity of their services. Cloud services are designed to be elastic, allowing customers to dynamically scale resources up or down based on demand to handle varying workloads efficiently.

Cloud providers offer various managed services, such as databases, machine learning, analytics, runtimes, and other aspects that allow customers to leverage advanced functionalities without the need for deep expertise in those domains. Various application programming interfaces (APIs) can be exposed by a cloud provider that enables users to programmatically interact with and manage their resources and allow integration with third-party tools and the automation of various tasks.

Fundamentally, in past server architectures, a server was defined with a fixed internet protocol (IP) address. In cloud-based computing, IP addresses are dynamic and enable the resources within the cloud providers. Cloud environments utilize dynamic scaling to accommodate varying workloads and dynamic IP addresses allow for the automatic allocation and release of addresses as resources are provisioned or de-provisioned. The dynamic addresses also allow service elasticity to respond to increasing or decreasing resources, cost efficiency, automation and orchestration of tools within the cloud integration and deployment environment, load balancing, high availability and failover, adaptable network topology, and increase resource utilization.

Cloud security is a fundamental issue as customers typically may deploy resources and integrate into resources of different cloud providers. While the clouds have a generic infrastructure configuration with a spine network topology that routes traffic to a top-of-rack (TOR) switch and servers within the racks, clouds are still configured differently and have different requirements. For example, some cloud providers emphasize different geographical markets; cloud providers can emphasize different business segments (e.g., healthcare, government, etc.) and configure services according to their intended market.

Cloud security has become an important aspect of networking today because there are significant challenges. For example, data breaches are a significant concern in the cloud because unauthorized access to sensitive data, either through misconfigurations or cyberattacks, can lead to data exposure and compromise the confidentiality of information. Misconfigurations of cloud services, such as incorrectly configured access controls or insecure storage settings, can create vulnerabilities and may expose data to unauthorized users or attackers.

Another important aspect of cloud security is identity management. Improper management of user identities and access privileges can result in unauthorized access. Inadequate or improperly implemented encryption can lead to data exposure. This includes data in transit, data at rest, and data during processing. Ensuring end-to-end encryption is crucial for maintaining data confidentiality.

Cloud providers use shared infrastructure and technologies. Multiple clients could be affected simultaneously if a vulnerability is discovered in a shared component. Regular security updates and patches are essential to mitigate this risk, and there is an increased market for third-party services that integrate into cloud provider services.

Organizations may fail to conduct thorough due diligence when selecting a cloud service provider (CSP). Inadequate assessment of a provider's security measures, compliance standards, and data protection practices can result in security gaps.

The evolving landscape of cybersecurity introduces new threats and attack vectors. Cloud security solutions continuously adapt to address emerging threats, such as zero-day vulnerabilities and advanced persistent threats (APTs). These attacks can come from many different sources, and monitoring these threats can be too difficult for entities.

The cloud is dynamic, connected, and encrypted. Customers of cloud providers primarily care about their business operations and not the infrastructure behind the business operations. In the current environment, customers of CSPs need to implement instruction protection services (IPS), instruction detection services (IDS), web application firewalls (WAF), as well as provide egress security. Customers may also need to implement data loss prevention services (DLP) to comply with sensitive information requirements.

A gateway uses data path rules to provide network traffic management, security enforcement, and access control. Data path rules are meticulously crafted to regulate the flow of data entering and leaving the network, ensuring that data adheres to established policies and meets security standards. With thousands of rules potentially in place, the granularity and specificity of these regulations can vary widely, encompassing factors such as IP addresses, protocols, ports, content inspection criteria, and quality of service parameters. Each rule defines a set of conditions and corresponding actions, dictating how incoming and outgoing packets should be handled by the gateway. For instance, rules may allow or deny access based on source and destination addresses, prioritize important applications over non-essential traffic, or inspect payloads for signs of malicious activity.

The proliferation of rules within a gateway is a result of the complex and diverse requirements of modern networks. The gateway and other components of the network provide critical business functions such as protecting sensitive data, mitigating cyber threats, and optimizing network performance. Different departments or user groups may have distinct needs, necessitating tailored access controls and traffic management policies. Moreover, compliance mandates, industry regulations, and evolving threat landscapes contribute to the need for comprehensive rule sets that address various scenarios and contingencies. In this context, the sheer volume of rules reflects the multifaceted nature of network management and security, requiring a nuanced approach to rule creation and maintenance to effectively safeguard the integrity and functionality of the network infrastructure.

Each CSP may have distinct information that is required to connect the gateways. For example, each CSP may have a unique VPC, or virtual network associated with a tenant, thereby requiring the tenant to have multiple configurations for each CSP. Moreover, the tenant may have different configurations per region, each with its own unique addresses and other CSP-specific content. Ensuring that each configuration is identical with the exception of CSP-specific content is a complex task identification of differences is time-consuming and creates many opportunities to create different errors in different configurations.

Disclosed are systems, apparatuses, methods, computer readable medium, and circuits for a single configuration for multi-cloud firewall deployment. The disclosed systems and techniques can reduce errors by abstracting cloud-specific information to enable a single configuration that is mapped to each corresponding cloud.

According to at least one example, a method includes: receiving a request to configure a firewall in a cloud service provider, the request including a tag including a name that identifies a single firewall configuration information; and providing derived firewall information from the single firewall configuration information based on an identity of the cloud service provider and the tag, wherein the single firewall configuration information includes network information for connecting the firewall to a private network in the cloud service provider.

In another example, a controller of a cloud security platform for configuring resources of a service distributed across multiple cloud service providers is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the one or more processors to: receive a request to configure a firewall in a cloud service provider, the request including a tag including a name that identifies a single firewall configuration information; and provide derived firewall information from the single firewall configuration information based on an identity of the cloud service provider and the tag, wherein the single firewall configuration information includes network information for connecting the firewall to a private network in the cloud service provider.

In multiple cloud network environments, the existing array of security services predominantly originates from a framework for safeguarding on-premises networks. While these services have undergone adaptation to accommodate the expansion of enterprise networks into public clouds, their foundational design predominantly caters to on-premises infrastructures. Consequently, the extension of these services often results in suboptimal security offerings for cloud-based applications and workloads lacking a cloud-native design.

The migration of customers to cloud environments, often spanning multiple cloud providers, introduces dynamic workloads. Unlike traditional data center setups where attributes such as static IP addresses and IP ranges are employed for network security, the cloud's dynamic nature complicates this approach. Workloads within cloud environments exhibit fluid behavior, constantly spawning, terminating, and transitioning. Attempting to delineate security policies based solely on static IP addresses becomes impractical and ineffective in the cloud paradigm.

This discrepancy between traditional network security methodologies and the dynamic nature of cloud workloads creates a challenge. As organizations increasingly leverage cloud services across various providers, there arises an imperative to recalibrate security strategies to align with the intrinsic characteristics of cloud computing. Relying solely on conventional network security, such as using IP addresses to define network policies, risks leaving cloud-based applications and workloads vulnerable to emerging threats and operational inefficiencies. Thus, a paradigm shift towards cloud-native security frameworks is imperative to ensure reliable protection and operational resilience in multi-cloud environments.

To address the above challenges, the disclosed technology offers methods to constantly update a real-time model of an enterprise's network and assets. This model is then used to enforce security policies effectively. Using this technology, enterprises can define application workloads using tags and attributes, making it easier to detect changes in their environment, such as the introduction of new workloads in real time. This functionality works seamlessly across multi-cloud environments, providing comprehensive visibility and adaptability in dynamic computing landscapes.

This technology employs a real-time consumer mechanism to promptly receive the instantiation of new workloads published from a cloud service provider to ensure continuous association between applications and policies. Furthermore, the system does not just track the creation of new application instances but also monitors all changes within the cloud network, including configuration modifications. For instance, alterations to existing virtual machines (VMs), such as name modifications or tag adjustments, are promptly reflected in real time by the publisher of the associated cloud service provider.

Ensuring effective security policies becomes increasingly complex with the proliferation of services across various cloud service providers. Accordingly, the proposed technology involves the utilization of a controller tasked with assigning tags to services detected within a cloud service provider's infrastructure. This controller operates with a security gateway, facilitating seamless integration of security protocols across diverse cloud environments. By assigning tags to services, the controller enables granular control and monitoring, bolstering the overall security posture of the cloud infrastructure.

In one aspect, a method for inventory monitoring in a multi-cloud network environment involves several steps. Firstly, the method entails receiving user input providing account information and credentials to grant the controller access to the account with the public cloud provider. The controller can use the account information and account credentials to query the account at the public cloud to learn of the existence of virtual private clouds (VPCs) (all VPCs in the user account including a first VPC and a second VPC), instances within the VPCs, and other resources in regions of the public cloud provider using APIs. For example, a cloud service provider (CSP) hosts these virtual private clouds accessible by the first account. Subsequently, the controller queries the first virtual private cloud using the first account information. It utilizes Application Programming Interfaces (APIs) provided by the CSP to identify resources within the cloud environment hosted by the public cloud provider accessible by the first account. Similarly, the controller can query the first account to further discover a second virtual private cloud using the first account information and corresponding APIs to identify additional resources. These identified resources are then collected into an inventory by the controller. Moreover, the controller maintains a mapping of tags to the resources in the inventory. These tags associate a security policy with each respective resource. The controller forwards a first subset of this mapping, containing mappings relevant to the first virtual private cloud, to a first security gateway within that cloud. This subset is applied by the first security gateway automatically to resources instantiated within the first virtual private cloud. It does so when a resource is associated with a tag that maps to a corresponding security policy. Likewise, the controller forwards a second subset of the mapping, which includes mappings relevant to the second virtual private cloud, to a second security gateway within that cloud. The second security gateway automatically applies a second security policy to resources instantiated within the second virtual private cloud. This is done when a resource is associated with a tag that maps to the corresponding security policy. This onboarding of an account at a public cloud provider and the automatic discovery of VPCs, instances, and resources within the account at public cloud provider can be repeated for multiple public cloud providers.

In some aspects, the techniques described herein relate to a method, wherein the first and the second tag are assigned by an administrator of the account environment through the user interface of the controller.

In some aspects, the techniques described herein relate to a method, wherein the CSP includes of a plurality of CSPs, the CSPs including one or more different subsets of resources.

In some aspects, the techniques described herein relate to a method, wherein the controller is configured to communicate with the first security gateway in the first virtual private cloud, and the second security gateway in the second virtual private cloud.

In some aspects, the techniques described herein relate to a method, further including: generating, by the controller, a model based on the first tag and the second tag, wherein the model associates all of the tags with corresponding security policies, and wherein the security gateway utilizes this model to enforce assigned security policies on the respective services associated with the tags in the network environment.

In some aspects, the techniques described herein relate to a method, wherein the controller utilizes the inventory including the assigned tags and the associated network information, and reconciles the inventory to enable a user to define security policies in terms of the tags by referencing the generated model, allowing the controller to associate services with specific tags and identify services sharing a same tag within the network environment.

In some aspects, the techniques described herein relate to a method, wherein a plurality of predefined attributes is associated with one or more user-defined workload associations applicable to the CSP.

In some aspects, the techniques described herein relate to a method, wherein the inventory provides visibility into one or more services and their associated tags associated with the CSP.

In some aspects, the techniques described herein relate to a method, further including: monitoring, at the controller, a workload associated with the monitoring of one or more services at the CSP; and upon detecting that a predefined threshold workload is met, generating a plurality of additional CSPs to assist with the monitoring of the one or more services, a number of the additional CSPs configured to dynamically adjust based on the predefined threshold.

In some aspects, the techniques described herein relate to a method, further including detecting from the network information one or more security events at the security gateway; and assigning a context to the security events identifying whether the security events is a malicious attack.

In some aspects, the techniques described herein relate to a method, further including: determining, by the controller, an applicability of a tag within the inventory to one or more regions in the network environment; and upon identification that at least one security gateway associated with a respective region lacks an identified security policy linked to the identified tag, transmitting, by the controller, an update to the security gateway, incorporating the identified security policy.

In one aspect, a network device comprising a processor and a memory storing instructions that, upon execution by the processor, configure the network device to perform several functions. Firstly, the device receives user input through a user interface of a controller. This input encompasses first account information granting the controller access to a first virtual private cloud and a second virtual private cloud, both hosted by a cloud service provider (CSP) in the multi-cloud environment. The controller queries the first virtual private cloud using the provided first account information and employs Application Programming Interfaces (APIs) of the CSP to identify resources within it, gathering them into an inventory. Similarly, the controller queries the second virtual private cloud using the first account information and corresponding APIs to identify resources associated with the second virtual private cloud, also collecting them into the inventory. The controller maintains a mapping associating tags with the resources in the inventory, with each tag linking to a specific security policy for its respective resource. The controller then forwards a subset of this mapping, relevant to the first virtual private cloud, to a first security gateway within that cloud. This subset includes mappings pertinent to the first virtual private cloud, enabling the first security gateway to automatically apply a first security policy to a resource when instantiated and associated with a tag corresponding to that policy. The controller forwards another subset of the mapping, relevant to the second virtual private cloud, to a second security gateway within that cloud. This subset contains mappings relevant to the second virtual private cloud, enabling the second security gateway to automatically apply a second security policy to a resource when instantiated and associated with a tag corresponding to that policy.

In one aspect, the techniques described include a non-transitory computer-readable medium containing instructions. When executed by a computing system, these instructions prompt the system to carry out several operations. Firstly, the system receives user input through a controller's user interface. This input includes first account information, enabling access to a first virtual private cloud, and a second virtual private cloud. Notably, a CSP hosts these virtual private clouds. The controller queries the first virtual private cloud using the provided first account information, utilizing APIs of the CSP to identify resources within this cloud, subsequently gathering them into an inventory. Similarly, the controller queries the second virtual private cloud using the first account information and corresponding APIs to identify resources, also collecting them into the inventory. The controller maintains a mapping associating tags with the resources in the inventory. Each tag links to a specific security policy for its respective resource. The controller then proceeds to forward a subset of this mapping, relevant to the first virtual private cloud, to a first security gateway within that cloud. This subset comprises mappings pertinent to the first virtual private cloud, enabling the first security gateway to automatically apply a first security policy to a resource upon instantiation and association with a tag corresponding to that policy. The controller forwards another subset of the mapping, relevant to the second virtual private cloud, to a second security gateway within that cloud. This subset contains mappings relevant to the second virtual private cloud, empowering the second security gateway to automatically apply a second security policy to a resource upon instantiation and association with a tag corresponding to that policy.

EXAMPLE EMBODIMENTS

FIG. 1 is a conceptual diagram of a networking environment 100 associated with a cloud security platform that integrates into different cloud providers according to some aspects of the disclosure. In some aspects, the networking environment 100 includes a plurality of applications 102 that are connected to a cloud security platform 104 that is configured for various aspects of cloud security. The cloud security platform 104 comprises a compute layer that is configured to discover applications and network resources, deploy cloud-based firewalls and management, and provide multi-cloud policy and control from a single end point.

The applications 102 include various forms, such as distributed cloud-based applications, edge-based applications (e.g., webapps), desktop-based applications, mobile phone applications, and so forth. The third-party services 106 include various services, such as cloud service providers and other services that are integrated into the cloud security platform 104. For example, the cloud security platform 104 may be configured to use different services for specialty functions that are consistent for each customer of the cloud security platform 104. Non-limiting examples of different services include various types of communication services (e.g., mail servers, communication platforms, etc.), security-oriented services (e.g., monitoring services such as Splunk), search services, storage services (e.g., relational databases, document databases, time-series databases, graph databases, etc.), authentication services, and so forth.

The cloud security platform 104 is configured to be deployed within various infrastructure environments in a PaaS manner. The cloud security platform 104 includes networking infrastructure 108 for connecting the application 102 to the cloud security platform 104. The cloud security platform 104 includes a plurality of servers 110 that are geographically distributed, with each server being managed by with various operating systems (OS) 112, runtimes 114, middleware 116, virtual machines (VM) 118, APIs 120, and management services 122. In some aspects, the cloud security platform 104 includes a runtime 114 refers to the environment that the middleware 116 will execute within to control various aspects of the cloud security platform 104. For example, the VMs 118 may be Kubernetes containers and the middleware 116 may be configured to add or remove hardware resources within cloud providers dynamically.

The cloud security platform 104 also exposes one or more APIs 120 for allowing the applications 102 to interact with the cloud security platform 104. The APIs 120 enable a customer to surface information, interact with information within the cloud security platform 104, and perform other low-level functions to supplement the security services of the cloud security platform 104. The API 120 is also configured to integrate with other third-party services (e.g., the third-party service 106) to perform various functions. For example, the API 120 may access a customer's resources in a cloud service provider (e.g., a third-party service 106) to monitor for threats, analyze configurations, retrieve logs, monitor communications, and so forth. In one aspect, the API 120 integrates with third-party cloud providers in an agnostic manner and allows the cloud security platform 104 to perform functions dynamically across cloud providers. For example, the API 120 may dynamically scale resources, allow resources to join a cluster (e.g., a cluster of controller instances), implement security rules from the cloud security platform 104 into the corresponding cloud provider, and other functions that enable a cloud-agnostic and service-agnostic integrated platform. For example, in some cases, the API 120 is configured to integrate with other security services to retrieve alerts pertaining to specific assets to reduce exposure to malicious actors.

The cloud security platform 104 also includes management services 122 for managing various resources of a customer. In some aspects, the management services 122 can manage resources including a controller (e.g., the controller 210 in FIG. 2), data resources (e.g., a data plane 270 in FIG. 2), and various integrations (e.g., a gateway 250, third-party services 252, cloud providers 254 in FIG. 2). For example, the management services 122 may allow the customer to manage various third-party resources such as a cloud-based relational database, a cloud-based document database, a cloud-based storage service (e.g., various implementations of the S3 API) and so forth.

In one aspect, the management services 122 include an onboarding user experience that connects to various cloud providers (e.g., using the API 120) and allows onboarding of different cloud resources. The management services 122 also provides a cloud-agnostic approach to managing resources across different cloud providers, such as scaling up identical resources in different regions using different cloud providers. As an example, some cloud providers do not have a significant presence in the far east, and the management services 122 are configured to activate similar resources in a first geographical region (e.g., in Europe) and a second geographical region (e.g., Asia) with similar configurations in different cloud providers.

The cloud security platform 104 is configured to provide security across and within cloud providers in different contexts. For example, the cloud security platform 104 provides protection and security mechanisms in different flows. The cloud security platform 104 is configured to provide varying levels of protection based on flow, packet, encryption and other mechanisms. In one aspect, the cloud security platform 104 is configured to protect forwarding flows and packet flows.

Forwarding flow refers to the set of rules and decisions that determine how network devices handle incoming packets without inspecting packet and traffic contents. A forwarding flow involves making decisions based on information such as destination IP address, media access control (MAC) address, and routing tables to determine the outgoing interface for the packet and typically includes actions like address resolution (e.g., ARP for IP to MAC address mapping), updating MAC tables, and forwarding the packet to the appropriate interface, and various rules to apply based on configuration and policies.

A proxy flow comprises both forward proxy and reverse proxy functions and inspects the content of encrypted flows and access control. In some aspects, the cloud security platform 104 decrypts encrypted traffic to ensure malicious actors are not exploiting vulnerabilities in TLS-encrypted applications, and prevents data exfiltration (e.g., DLP) or connection to inappropriate URLs.

The cloud security platform 104 is also configured to handle packets differently based on security, such as policies related to IPS and a web application firewall (WAF). WAF protects various web applications from online threats, such as SQL injection, cross-site scripting (XSS), authentication spoofing, and other potential security. For example, a WAF filters and monitors traffic by inspecting headers (e.g., a JSON-encoded object in an HTTP header).

The cloud security platform 104 provides real-time discovery of multi-cloud workloads, at-scale, for virtual private clouds (VPCs) and cloud accounts. Real-time discovery also enables finding security gaps and improving defensive posture. The cloud security platform 104 also provides a data-plane management using gateways (e.g., the gateway 250 in FIG. 2) that provides self-healing via in-band/transparent diagnostics), seamless upgrade (e.g., no downtime or user intervention), and auto-scaling. The cloud security platform 104 may implement a containerized service (e.g., Kubernetes) to enable scale out deployments with a high service level agreement (SLA) without having to maintain network security infrastructure and integrate with cloud-native networking to enable automation of distributed and centralized (hub-n-spoke) architectures for ingress, egress, east-west (including microsegmentation) and hybrid cloud configurations. The cloud security platform 104 maintains traffic within cloud account boundaries and customers retain control of their private encryption keys without needing to share encryption keys with the control plane (e.g., the controller 210 of FIG. 2).

Figure 2:
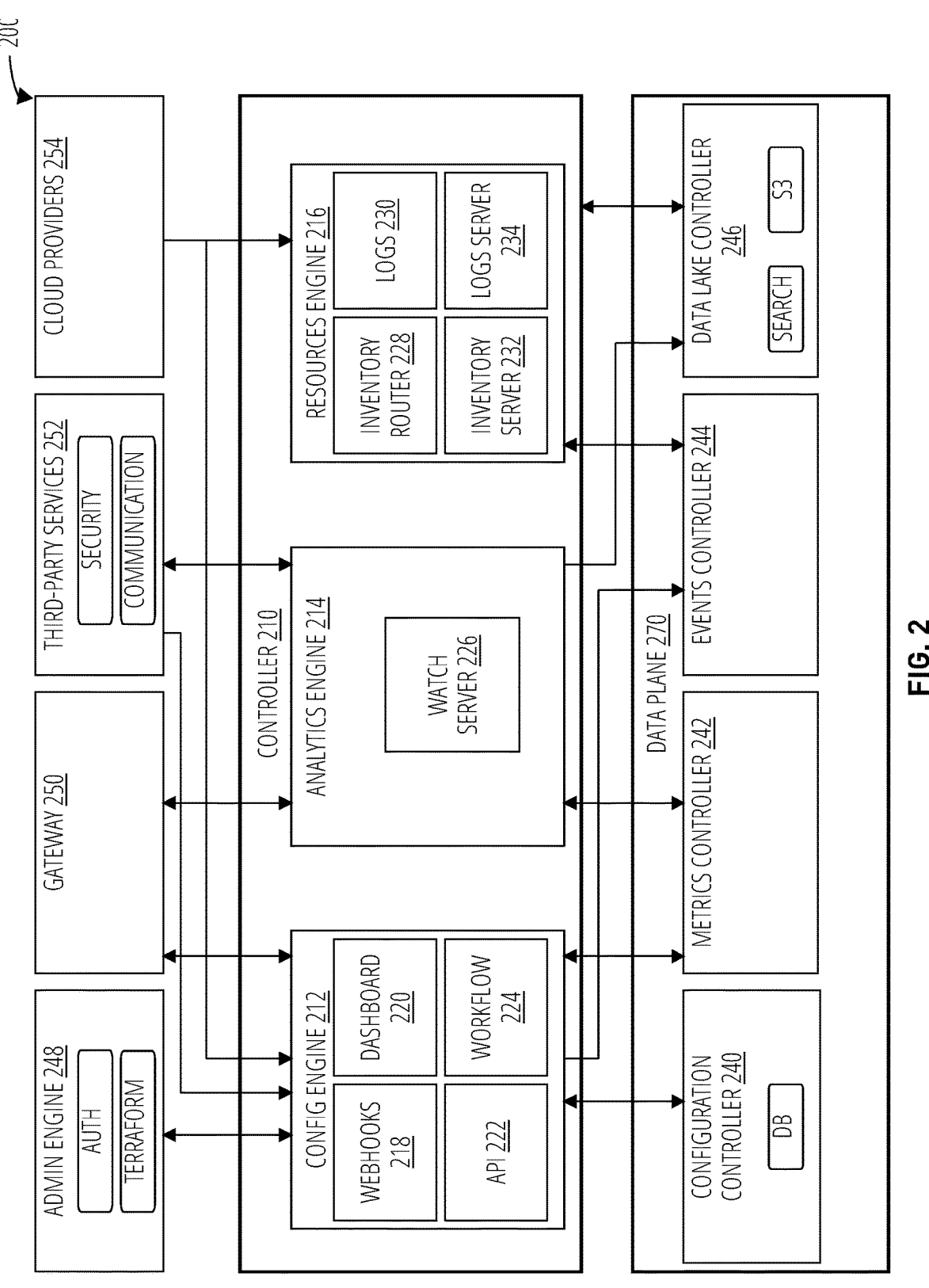
FIG. 2 is a conceptual diagram of a controller of a cloud security platform that integrates into different cloud service providers in accordance with various aspects of the disclosure.

FIG. 2 is a conceptual diagram of a cloud security platform that integrates into different cloud service providers in accordance with some aspects of the disclosure.

In some aspects, the cloud security platform 200 separates compute and data storage functions and enables a multi-tenancy to support different customers while maintaining data separation when needed. For example, the compute components are separated into a controller 210 and data storage components are implemented in a data plane 270. The controller 210 may be a collection of Kubernetes-based services that deploy a low latency connection (e.g., gRPC) to connect various endpoints and enable bidirectional streaming, preventing connection setup and teardown. Each service within the controller 210 scales up or down horizontally based on load.

The controller 210 includes a configuration engine 212, an analytics engine 214, and a resources engine 216. The configuration engine 212 configures the various components and provides various services such as webhooks 218, a dashboard 220, an API 222, and a workflow 224.

In one aspect, the webhooks 218 module configures an asynchronous method of communication between different applications or services in real-time. In a webhook configuration, one application can register an endpoint URL with another, specifying where it should send data when a particular event occurs. When the event triggers, the originating system automatically pushes data to the registered URL, allowing the receiving application to process and act upon the information immediately. In some aspects, the webhooks 218 modules implements an observer pattern, with a dependent component providing a URL to the observed data source.

The dashboard 220 provides a user experience to a customer of the cloud security platform 104 and provides various integration modules, onboarding platforms, monitoring tools, and other functions for customers to access.

In some aspects, the APIs 222 can be various libraries to interact with various services, either through a dashboard 220 interface, a command line interface (not shown), or other tooling (not shown). The APIs 222 can also be API endpoints of the cloud security platform 104 or an API library associated with a third-party service (e.g., third-party services 252), or APIs associated with the cloud providers 254. In one aspect, the APIs 222 can include an agnostic API library that is configured to interact with the cloud providers 254 using a single API interface to scale resources, respond to security incidents, or other functions. This API 222 can be accessed via a command line interface or may be distributed to customers via various package management services.

The workflow 224 module can be various components that enable a customer to perform various tasks, such as manage specific resources, deploy services, communicate with team members regarding issues, and so forth. For example, the workflow 224 module can interact with the gateways 250 and an administration engine 248 to manage resources, access to resources, and deployment of various resources (e.g., deploy infrastructure with Terraform).

The analytics engine 214 is configured to integrate with gateways 250 and various third-party services 252 to monitor various events, services, and other operations. The analytics engine 214 includes a watch server 226 that is configured to disambiguate information from multiple sources of information (e.g., the gateway 250, the third-party services 252, etc.) to provide a wholistic view of cloud networking operations. The analytics engine 214 may also be configured to interact with various components of the data plane 270 such as a metrics controller 242 and a data lake controller 246.

In some aspects, the resources engine 216 receives resources from cloud providers 254 and includes various components to route information and store information. The resources engine 216 includes an inventory router 228, logs 230 (e.g., a cache of logs for various function), an inventory server 232, and a logs server 234. The components of the resources engine 216 are configured to disambiguate and combine information in agnostic and standardized manner and store various resources in the data plane 270. For example, the resources engine 216 stores and receives events from an events controller 244 and also sores and receives logs in the data lake controller 246. In some aspects, the inventory router 228 and the inventory server 232 build an evergreen model of the customer's cloud accounts and subscriptions and create an address object for security policy management for the cloud security platform 200. The address object represents a segment of the customer's subscription based on cloud native attributes (e.g., Security Group, ASG, customer-defined tags) and maps to a collection of IP Addresses which is automatically refreshed and synchronized with the gateway 250.

The data plane 270 includes various components to separate various types of information associated with the control plane and interconnected third-party services 252 and cloud providers 254. For example, the data plane 270 includes a configuration controller 240 that stores inventory information of a customer and various configuration information. In one example, the cloud providers 254 use different metrics for decisions pertaining to scaling deployed resources, and the configuration controller 240 stores information that allows the controller 210 to scale resources within the cloud providers 254 in a standardized manner. In some aspects, the configuration controller 240 may include storage mechanisms such as a relational database, a document database, and other high-availability storage mediums. The storage mechanisms can be on-premises resources or off-premises or cloud-based solutions such as various cloud-based relational or document databases (e.g., Redis, MySQL, MongoDB, etc.).

The data plane 270 also includes a metrics controller 242 that is configured to interact with custom metrics data or a third-party service for metrics analysis (e.g., Amazon Cloud-Watch). The events controller 244 is configured to handle and store events and various queues. For example, the events controller can include a Kafka server for handling real-time data feeds and event-driven applications. The metrics controller 242 may use a publish-subscribe model in which producers (e.g., a third-party service, and internal components of the controller 210, a gateway 250, etc.) publish data streams and a consumer subscribes to receive and process these streams in a fault-tolerant and distributed manner. The metrics controller 242 may handle massive amounts of data with low latency and high throughput.

The data lake controller 246 provides a long-term and scalable storage mechanism and associated services. For example, the data lake controller 246 may include a cloud-based S3 API for storing to various cloud services (e.g., AWS, DigitalOcean, OpenShift) or on-premises services (e.g., MinIO, etc.). The data lake controller 246 may also include a search-based mechanism such as ElasticSearch for large-scale and efficient search of contents within the non-volatile cloud storage mechanisms. In some aspects, the data lake controller 246 stores network logs and implements search functionality (e.g., Snowflake) for large-scale ad hoc queries for security research and analysis.

The cloud security platform 200 also includes an administration engine 248, a gateway 250, and integrations into various third-party services 106. The administration engine 248 may include authentication services (e.g., Auth0, Okta) to verify identity and provide authentication mechanisms (e.g., access tokens), and may include infrastructure as code (IaC) tools such as Terraform to automate the process of creating, updating, and managing the specified infrastructure across various cloud providers or on-premises environments.

The cloud security platform 200 includes gateways 250 that are deployed into various integration points, such as cloud providers. The gateways 250 an ingress and egress points of the cloud security platform 200 and are configured to monitor traffic, provide information to the controller 210, dynamically scale based on the cloud security platform 200, and provide security to a customer's cloud infrastructure. For example, the gateways 250 may implement a transparent forward and reverse proxy to manage traffic. The gateways 250 may also include a cloud-based firewall that is configured to filter malicious traffic using various dynamic detection policies.

The cloud security platform 200 also integrates into various third-party services 252 for various purposes such as receiving threat-related intelligence (e.g., Spunk, Talos, etc.). The third-party services 252 also include different types of infrastructure components such as managing mobile devices, implementing cloud-based multimedia communication services, business analytics, network analytics (e.g., reverse address lookup), certificate services, security information and event management (SIEM), and so forth.

Figure 3:
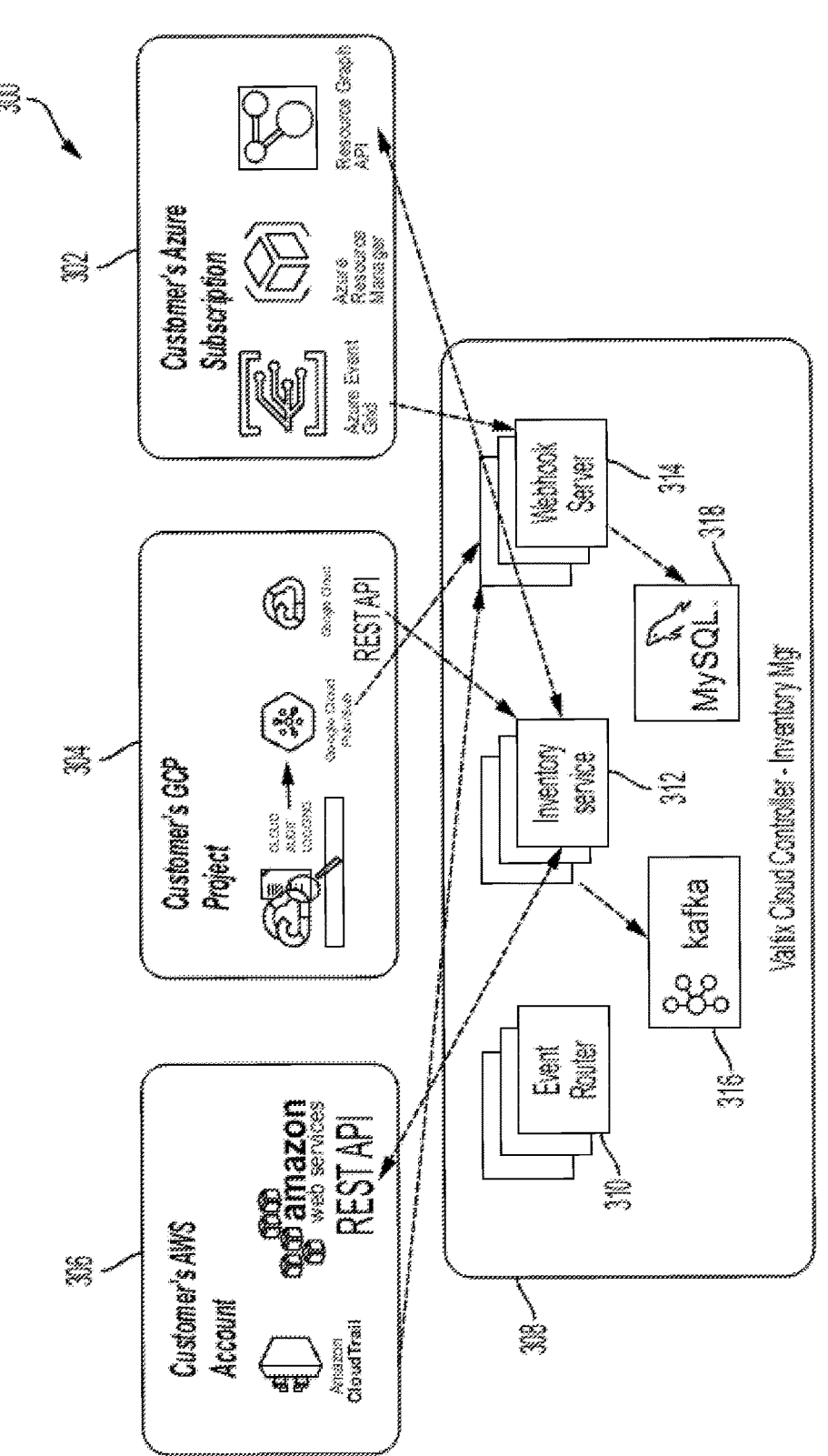
FIG. 3 is a conceptual diagram of a controller of a cloud security platform that integrates into different cloud service providers to perform inventory management in accordance with various aspects of the disclosure.

FIG. 3 is a conceptual diagram of a controller of a cloud security platform that integrates into different cloud service providers to perform inventory management in accordance with some aspects of the disclosure.

In some aspects, the cloud controller 308 may connect various endpoints and enable bidirectional streaming, preventing connection setup and teardown between cloud service providers 302, 304, and 306. The cloud controller 308 includes an event router 310, an inventory service, and a webhook server 314.

In one aspect, the event router 310 is configured to manage and direct events within the cloud network. Further, the event router 310 can subscribe to events related to each of the cloud service providers 302, 304, and 306.

In one aspect, the inventory service 312 is designed to construct a model of the customer's cloud accounts and subscriptions across each of the cloud service providers 302, 304, and 306. It also generates an address object for managing security policies within the cloud security platform 300. In some instances, a dedicated inventory service 312 may be allocated for each cloud service provider 302, 304, and 306. Within this setup, the inventory service 312 handles storage and reception of events from the event router 310 for each cloud service provider, disambiguating and consolidating information in a platform-agnostic and standardized manner. Subsequently, it stores various resources in the data plane 270, as depicted in FIG. 2. Additionally, the inventory service 312 is configured to oversee events streamed from the cloud service providers 302, 304, and 306 through an event streaming platform 316, such as Kafka.

In one aspect, the webhook server 314 establishes an asynchronous communication method between various applications or services in real-time. With webhook configuration, an application can designate an endpoint URL with another application, indicating where data should be sent upon a specific event. Upon event activation, the source system automatically sends data to the designated URL, enabling the recipient application to promptly process and respond to the information. In certain scenarios, the webhook server 314 may adopt an observer pattern, where a dependent component furnishes a URL to the observed data source.

FIG. 4 illustrates a block diagram of a data path pipeline 401 and integration with hardware in accordance with some aspects of the disclosure.

In some aspects, the data path pipeline 401 comprises a single-pass firewall architecture that uses a single-pass flow without expensive context switches and memory copy operations. In a single-pass flow, processing is not duplicated multiple times on a packet. For example, TCP/IP receive, and transmission operations are performed a single time. This is different from existing next-generation firewalls (NGFW). The data path pipeline 401 uses fibers with flexible stages completely running in user-space and, therefore, does not incur a penalty for kernel-user context switches, which are expensive in high bandwidth and low latency operations. The data path pipeline 401 provides advanced web traffic inspection comparable to WAFs to secure all traffic flows and break the attack kill chain in multiple places, raising the economic costs for attackers. The data path pipeline 401 also captures packets of live attacks into a cloud storage bucket without significant performance degradation and enables a rule-based capture on a per-session and attack basis.

The data path pipeline 401 is also configured to be flexible and stages of processing are determined on a per-flow basis. For example, application 1 to application 2 may implement an L4 firewall and IPS inspection, application 3 to application 4 may implement an L4 firewall, a TLS proxy, and IPS, and an internet client to web application 5 implements an L4 firewall, TLS proxy, IPS, and WAF.

In some aspects, the data path pipeline 401 includes various filters (e.g., malicious IP filter), geographic IP filter, FQDN filter) to filter both forwarding flows and proxy flows, as well as an L4 firewall to restrict traffic based on conventional techniques.

The data path pipeline 401 may also be integrated with a hardware offload 402 (e.g., an FPGA of a cloud provider, an ASIC, etc.) that includes additional functionality that does not impact throughput. In one aspect, a cloud provider may offer a hardware offload or an accelerator function to implement a specialized function. For example, the hardware offload 402 includes a cryptographic engine 403, an API detection engine 404, a decompression engine 405, a regex engine 406, and a fast pattern engine 407 to offload operations into hardware.

In one aspect, the data path pipeline 401 includes high throughput decryption and re-encryption to enable inspection of all encrypted flows using the cryptographic engine 403. By contrast, traditional NGFWs provide a throughput of around 10% for inspecting encrypted flows. The data path pipeline 401 may use a decompression engine 405 to decrypt compressed traffic and perform deep packet inspection. For example, the data path pipeline 401 also uses a userspace Linux TCP/IP driver, in addition with network address translation (NAT) in conjunction with the API detection engine 404 and the decompression engine 405 to eliminate problematic and malicious flows.

Figure 5:
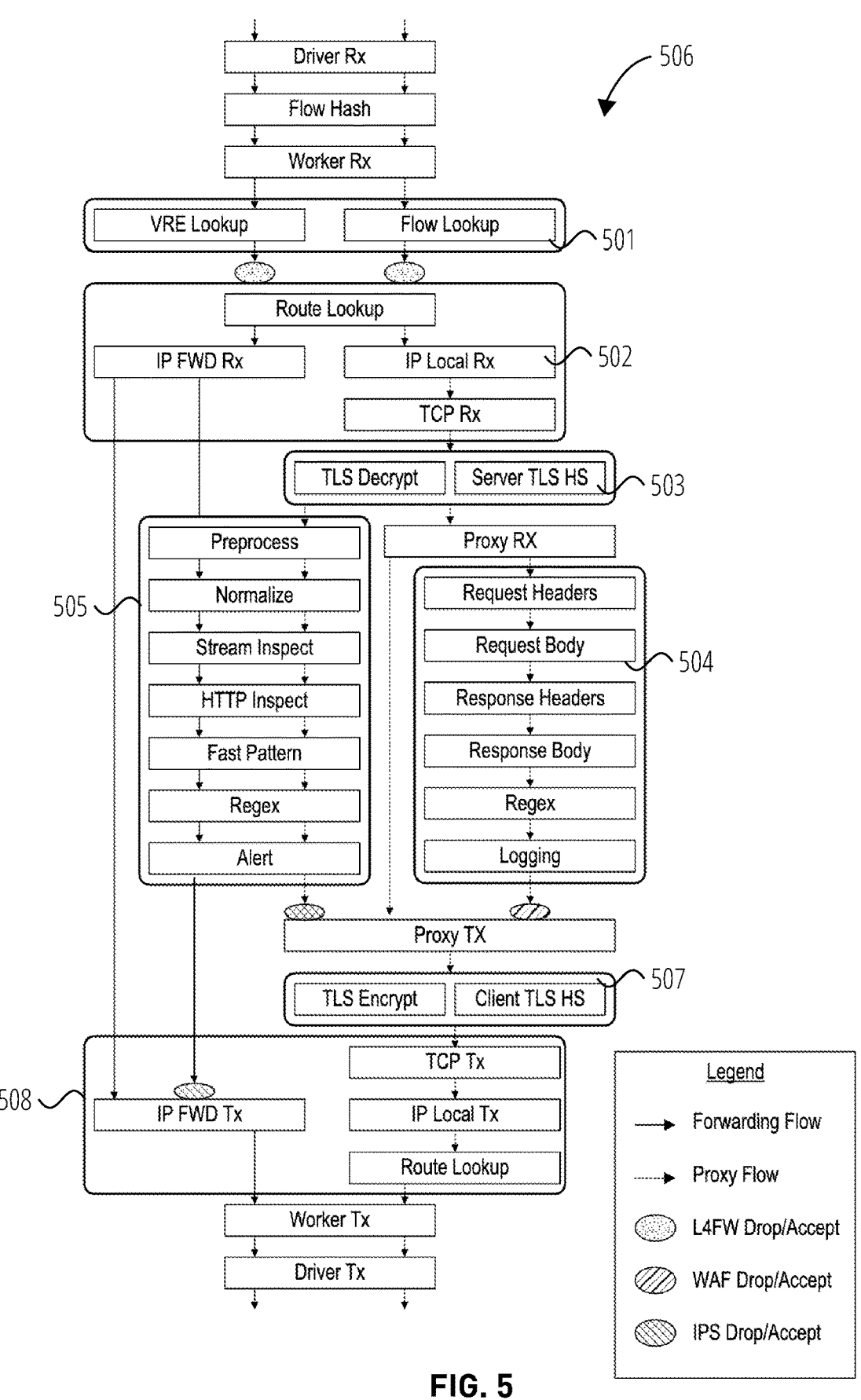
FIG. 5 illustrates a data path pipeline for forward packet flows and proxy packet flow of a cloud security platform in accordance with various aspects of the disclosure.

The data path pipeline 401 includes a transparent reverse and forward proxy to isolate clients and servers without exposing internal details, a layer 7 firewall to rate limit and protect applications and APIs, and secure user access by looking up end-user-specific identity from an identity provider (IDP) and provide zero trust network access (ZTNA). The data path pipeline 401 includes a WAF pipeline and an IPS pipeline to detect malicious and problematic flows in conjunction with a regex engine 406 and a fast pattern engine 407. For example, the WAF pipeline may implement protection for web applications, including OWASP Top 10, using a core ruleset and application-specific rules for frameworks and common content management tools like PHP, Joomla, and WordPress. The data path pipeline 401 includes IDS and IPS to block known vulnerabilities and provide virtual patching until the applications can be patched with updated security fixes, application identification to block traffic based on client, server or application payload, DLP loss and filtering, URL filtering, antivirus and anti-malware features to prevent malware files from being transferred for ingress (malicious file uploads), cast-west lateral attacks (moving toolkits) and egress flows (e.g., botnets FIG. 5 illustrates a data path pipeline 506 for forward packet flows and proxy packet flow of a cloud security platform in accordance with some aspects of the disclosure.

The data path pipeline 506 comprises a L4 firewall 501, a user space receive TCP/IP stack 502, a TLS receive proxy 503, a WAF 504, an IPS 505, a TLS transmit proxy 507, and a user space transmit TCP/IP stack 508 and illustrates the flow of forwarding flows and proxy flows, and points at which packets may be dropped/accepted using an L4 firewall, a WAF, and/or IPS.

For example, the data path pipeline 506 may be implemented as a user-space driver (e.g., a data path packet driver (DPDK) that receives forwarding and proxy flows, computes hashes, and provides the packet to the worker. In this case, a worker is part of a distributed instance of a gateway and provides the flows to the L4 firewall 501. For example, the L4 firewall 501, or a transport layer firewall, may inspect traffic and filter traffic based on source and destination IP/port.

The user space receives TCP/IP stack 508 is configured to perform the receive processing of forwarding and proxy flows. For example, the user space receive TCP/IP stack 502 handles framing, addressing, and error detection within TCP/IP and further identifies per-flow processing based on policies and rules of the cloud security platform. For example, some forwarding flows are provided to the user space transmit TCP/IP stack 508, some forwarding flows are provided to the IPS 505, and proxy flows are forwarded to the TLS receive proxy 503. The TLS receive proxy 503 manages the TLS decryption process in the event further inspection is warranted based on the policies and rules, and then provides the proxy flows to either the IPS 505 or the WAF 504 based on a policy.

The IPS 505 examines its content, headers, and contextual information. Deep packet inspection involves analyzing the payload and looking for patterns, signatures, or anomalies that may indicate malicious activity. The IPS compares the packet against a database of known attack signatures and employs heuristic analysis to detect deviations from expected behavior. Additionally, it assesses factors such as source and destination addresses, ports, and protocol compliance. If the IPS identifies a packet as potentially malicious, it can take proactive measures, such as blocking the packet, alerting administrators, or initiating predefined security policies to prevent the exploitation of vulnerabilities and safeguard the network from intrusion attempts.

The WAF 504 monitors, filters, and analyzes HTTP traffic in real-time and actively looks for and blocks common web vulnerabilities such as SQL injection, XSS, and other application-layer attacks. By examining and validating HTTP requests and responses, the WAF can detect and block malicious traffic, ensuring that only legitimate requests reach the web application. WAFs often employ rule-based policies, signature-based detection, and behavioral analysis to identify and mitigate potential security risks.

The TLS transmit proxies 507 reassembles the proxy flows and contextual information and provides the proxy flows to the user space transmit TCP/IP stack 508, which reassembles the packet and forwards any traffic. As shown in FIG. 5, flows can be dropped at different points identified in the user space receive TCP/IP stack 502, after the WAF 504 or the IPS 505, or in the user space receive user space transmit TCP/IP stack 508.

Figure 6:
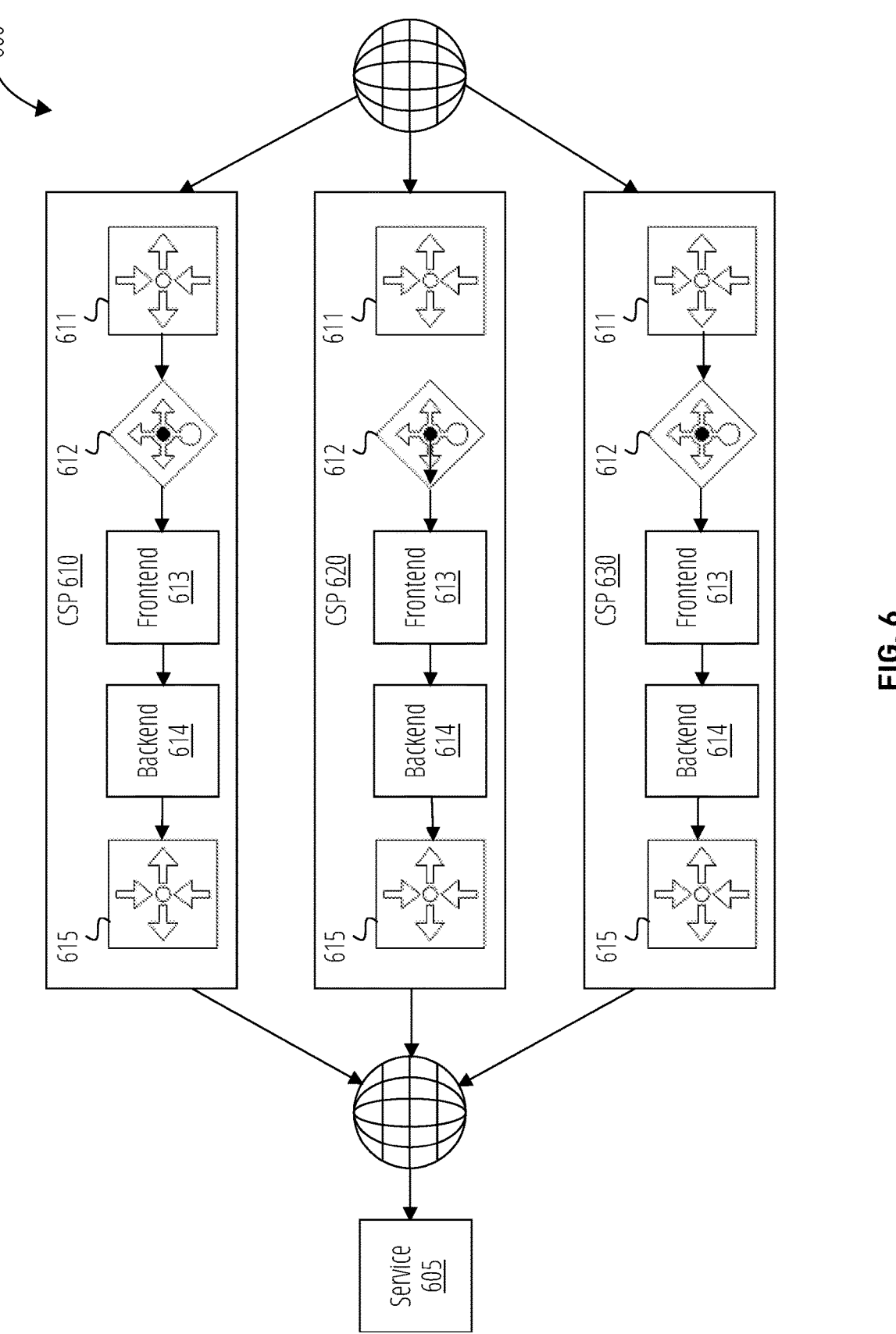
FIG. 6 is a conceptual diagram illustrating a cloud security platform integrated into a multi-cloud service in accordance with various aspects of the disclosure.

FIG. 6 is a conceptual diagram illustrating a cloud security platform integrated into a multi-cloud service in accordance with some aspects of the disclosure. In some aspects, a service 605 may be geographically distributed and implemented using multiple CSPs. The CSPs can be distributed for many different reasons, for example a particular CSP does not have service available in particular countries. In other aspects, the CSPs may not be distributed geographically to a sufficient extent. Pricing can also be a concern, with lower cost alternatives being available in high-bandwidth region. For at least these reasons, the service 605 may be distributed across CSP 610, CSP 620, and CSP 630 in this example.

Each of the distributed across CSP 610, the CSP 620, and the CSP 630 may include an ingress gateway 611, a load balancer 612, a frontend 613, a backend 614, and an egress gateway 615. In some aspects, the ingress gateway 611 and the egress gateway 615 may be provided by the cloud security platform and provide an agnostic interface to control flows into each different CSP. For example, the cloud security platform can scale resources in a consistent manner, provide malicious content filtering, attack denial, rate limiting, and other services to protect the service 605 at the corresponding CSP. The cloud security platform can also perform the corresponding services to a recipient of the service (not shown).

The cloud security platform abstracts specific details associated with each CSP into a single interface and allows an administrator of the service 605 a common control plane for controlling resources within each CSP and protecting services within each CSP and the service 605.

Figure 7:
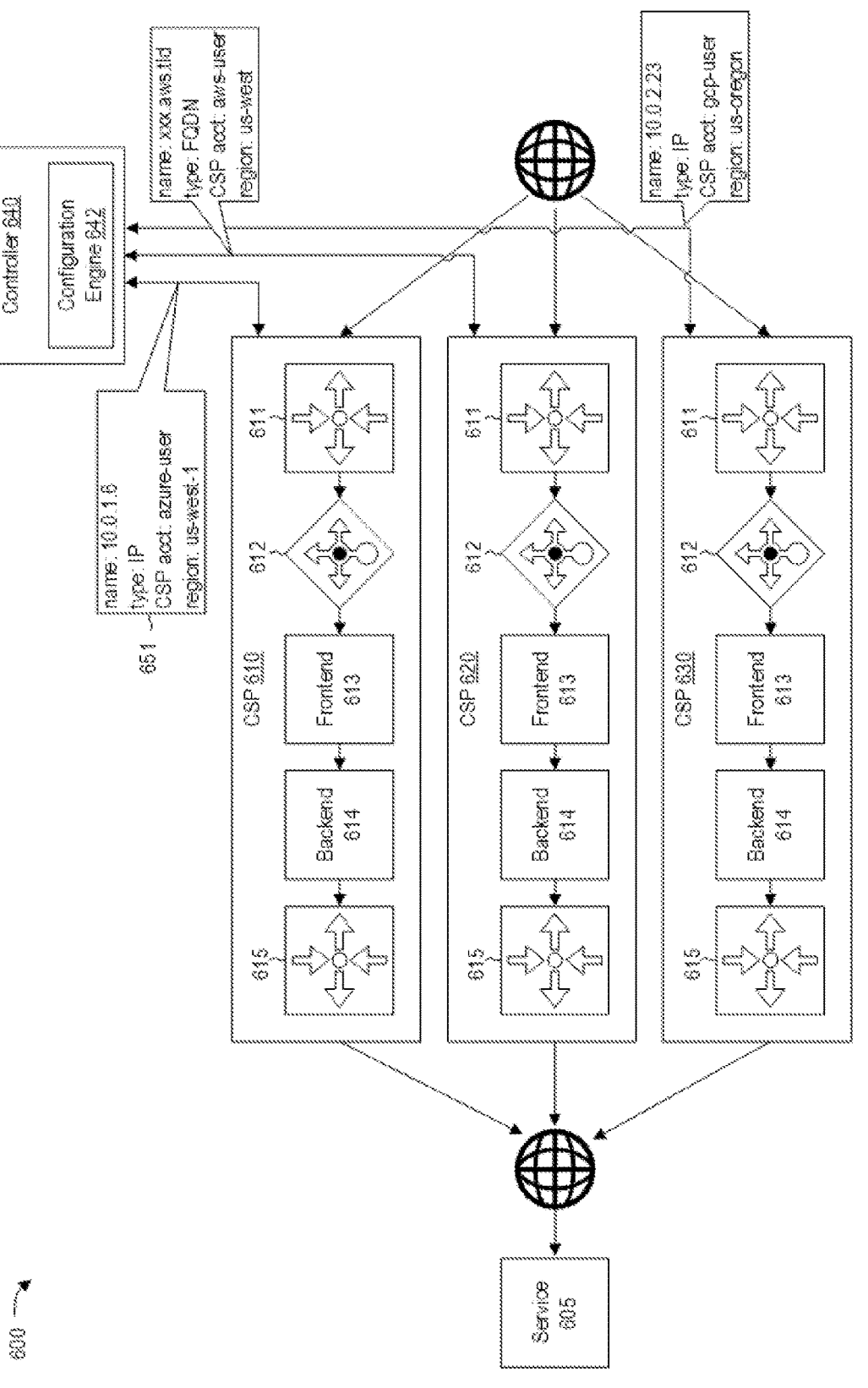
FIG. 7 is a conceptual diagram illustrating applying a single configuration to firewalls in a multi-cloud firewall deployment via a control plane in accordance with various aspects of the disclosure.

FIG. 7 is a conceptual diagram of a system 600 illustrating applying a single configuration to firewalls in a multi-cloud firewall deployment via a control plane in accordance with some aspects of the disclosure. The system 600 is configured to apply firewall rules across different CSP configurations, such a first CSP 610, a second CSP 620, and a third CSP 630. In this case, the first CSP 610, the second CSP 620, and the third CSP 630 are different CSPs. For example, the first CSP 610 is configured and deployed in Azure, the second CSP 620 is configured and deployed in AWS, and the third CSP 630 is configured and deployed in GCP.

Each configuration of the first CSP 610, the second CSP 620, and the third CSP 630 will be different based on different implementation details, addresses, and other variations. However, each CSP includes an ingress gateway 611, load balancer 612, frontend 613, a backend 614, and an egress gateway 615, and each component of the corresponding CSP is configured based on the control plane provided by a controller 640 (e.g., the controller 210 in FIG. 2).

Several network parameters are common and distinct across different cloud providers due to the similar implementation structure illustrated in FIG. 7. One example parameter that is common and distinct to each CSP is a user account or user credentials for accessing the CSP. The user credentials allow access to the internal resources of the particular CSP. There are other types of common and distinct parameters 651, such as VPC information or virtual network information, DNS, storage buckets, a region (e.g., US-west, US-cast, EU, JP, etc.), and so forth. In some cases, there can be slight variations of information, such as parameters pertaining to a secondary authentication, etc.

Each of these parameters is specific to a cloud deployment, while other rules and configurations are generic and independent of a particular cloud deployment. As an example, the rules for processing network traffic through each of the first CSP 610, the second CSP 620, and the third CSP 630 should be identical. In another example, access control lists (ACLs) and virtual private networks (VPNs), which enable users to control inbound and outbound traffic, enforce security policies, and establish secure connections between on-premises and cloud environments should be identical in each of the first CSP 610, the second CSP 620, and the third CSP 630.

In some aspects, there may be many security configurations that are stored in the controller 640 and applied to the different components of each of the first CSP 610, the second CSP 620, and the third CSP 630. For example, the security configurations can include different configurations and policies for security groups and security group rules/ports, application security groups, network ACLs and network ACL rules, subnets, route tables, network interfaces, VPNs and virtual networks, and applications. As a result, there can be hundreds of security groups and policies that need to be maintained in a consistent manner.

The controller 640 provides a common interface to control each of the first CSP 610, the second CSP 620, and the third CSP 630. In some aspects, the controller 640 includes a configuration engine 642 that configures a specific policy for each corresponding CSP. In some aspects, the configuration engine 642 receives an input of a rule and a tag and selects a policy rule to apply to the corresponding CSP based on the rule and the tag. For example, the tag can identify an ingress or egress, and may then build a configuration based on the selected policy. In this case, the configuration engine 642 abstracts particular implementation details that are specific to a CSP (e.g., account name, region, etc.) and delivers a set of rules. The controller 640 can therefore store a rule that applies equally to each corresponding CSP and reduce the number of rules and configurations that are individually maintained by an administrator.

In some aspects, each individual configuration can be stored as part of a ruleset (e.g., an array of cloud-specific configuration), or the ruleset can provide a weak reference (e.g., a string identifier such as a unique identifier (UUID) that uniquely identifies the configuration.

The system 600 illustrates an example in which the controller 640 provides three separate configurations to the first CSP 610, the second CSP 620, and the third CSP 630. For example, as shown in FIG. 7, each configuration includes various properties such as type, CSP account username, and region, for example. The configuration may include additional details (e.g., DNS address, authentication passcodes, SSL keys, etc.) necessary to connect components of the multi-cloud cloud security platform to the various CSPs and interact with each CSP. For example, in the event a new firewall configuration is made available via the controller 640, the controller 640 may invoke actions to trigger ingress and egress firewalls within each CSP to restart based on the new configuration. In some cases, the new configuration can be manually applied but can be an automated process based on an alert from a third-party vendor that monitors security vulnerabilities. In some aspects, the tag (e.g., ingress, egress, etc.) can be used to identify corresponding components and configure the components based on the configuration changes.

FIG. 8 is an illustration of data objects that can be applied to enable a single configuration in a multi-cloud firewall deployment in accordance with some aspects of the disclosure.

In some aspects, FIG. 8 shows a list of rules that are associated with a ruleset (e.g., web1-application, web1-API) and a category (e.g., forward proxy, reverse proxy, firewall, security). The web1-application is selected and shows a policy rule set (valtix-app-ingress), corresponding services, and a list of properties for corresponding CSP assets (e.g., Sub Objects in FIG. 8). In this case, the CSP assets include a name, an address type (IP, FQDN), an account, and information related to a VPC or virtual network within the corresponding cloud. The configuration engine 642 may build a corresponding configuration, including the rule set (e.g., valtix-app-ingress) based on the identity of the CSP. The configuration engine 642 generates a configuration based on a tag (e.g., ingress, egress, etc.).

FIG. 9 is an illustration of various rules that can be applied to a cloud security provider in accordance with some aspects of the disclosure. In some aspects, FIG. 9 illustrates the discovery of different assets configured for the multi-cloud application and includes different tags that can be applied to different assets. In this case, firewalls can include tag values that can be configured to apply to ingress and egress resources of the cloud to appropriately filter network malicious and undesirable network data before being received by an endpoint of the multi-cloud application. In this context, the configuration engine 642 can reduce the number of rules to simplify the creation of a single ruleset to apply to an ingress or egress firewall. Having a single ruleset ensures network policies are applied consistently irrespective of cloud-specific configurations and improves security operations.

Figure 10:
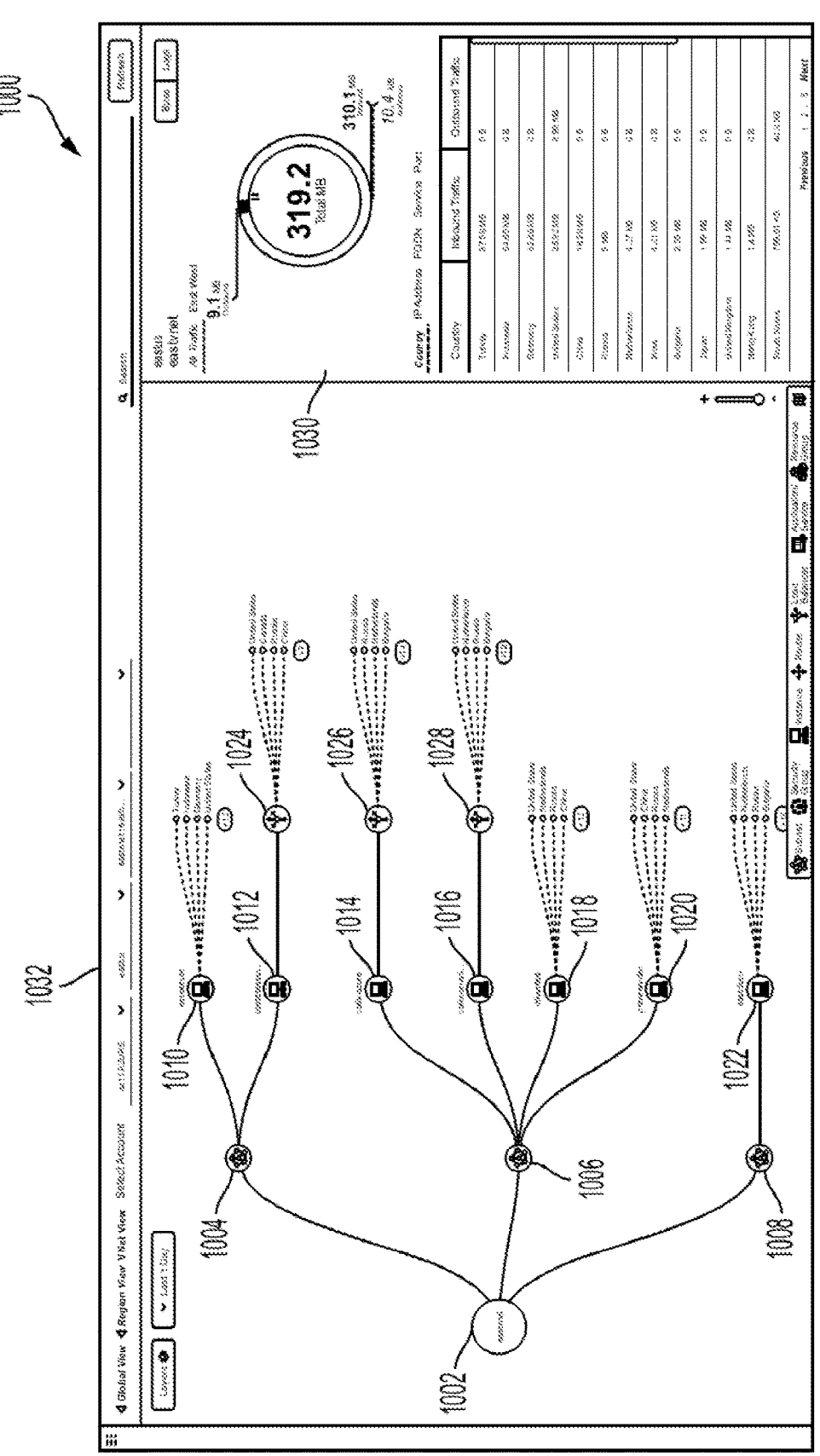
FIG. 10 illustrates an example dashboard depicting a dashboard 1000 for the cloud service platform in accordance with various aspects of the disclosure.

FIG. 10 illustrates an example topology depicted in a dashboard 1000 for the cloud service platform in accordance with various aspects of the disclosure.

In one aspect, the dashboard 1000 can provide a topological view of the performance of one or more regions of managed virtual networks (VNet). The dashboard 1000 can be filtered via filters 1032 in order to select a global, region, or VNet view of the overall cloud environment. Further, the filters 1032 can allow for the change in views of the current status of various sections of the cloud network, over one or more time periods. For instance, as illustrated in FIG. 10, the filters 1032 are presently configured to display a VNet view, showcasing the real-time status of "eastvnet". Within the dashboard 1000, the selected "eastvnet" is depicted as divided into multiple subnets 1004-1006, each of which hosts multiple gateway instances 1010-1022. Depending on the current data traffic of one or more instances, load balancers 1024-1026 can be employed to effectively distribute the data traffic across various countries worldwide in the cloud environment.

In one aspect, the dashboard provides the inclusion of a traffic indicator 1030 offering insights into the distribution of data traffic across the cloud environment. This traffic indicator 1030 can be customized with filters based on country, IP address, FQDN, service, or port. As illustrated in the current depiction in FIG. 10, the data traffic within the cloud environment is currently filtered by country. The traffic indicator displays the status of data traffic, indicating inbound traffic received and outbound traffic transmitted per country, and per VNet selected.

FIG. 11 illustrates an example routine 1100 for inventory monitoring in a multi-cloud network environment. Although the example routine 1100 depicts a particular sequence of operations, the sequence may be altered without departing from the scope of the present disclosure. For example, some of the operations depicted may be performed in parallel or in a different sequence that does not materially affect the function of the routine 1100. In other examples, different components of an example device or system that implements the routine 1100 may perform functions at substantially the same time or in a specific sequence.

According to some examples, the method includes receiving a user input in a user interface of a controller, block 1102. For example, controller 210 illustrated in FIG. 2 may receive a user input in a user interface of a controller 210. The user input comprises initial account details enabling controller access to a first virtual private cloud and additional account information granting access to a second virtual private cloud. The controller is set up to interact with the first security gateway within the first virtual private cloud and the second security gateway within the second virtual private cloud. Both the first and second virtual private clouds are hosted by a cloud service provider (CSP). This CSP encompasses multiple VPCs, each containing distinct subsets of resources.

According to some examples, the method includes querying the first virtual private cloud by using the first account information to access the first virtual private cloud and using APIs of the CSP to identify resources in the first virtual private cloud at block 1104. For example, the controller 210 illustrated in FIG. 2 may query the first virtual private cloud by using the first account information to access the first virtual private cloud and using APIs 222 of the CSP to identify resources in the first virtual private cloud. The resources are gathered and stored within an inventory, offering insight into various services and their respective tags linked with the CSP. Numerous predefined attributes are linked with user-defined workload associations applicable to the CSP. Controller 210 monitors the workload associated with overseeing services related to the resources at the CSP. When a predefined workload threshold is reached, additional gateways 250 can be created when new applications are detected. Similarly, gateways 250 can be further removed once the workload returns below the predefined workload threshold. Thus, these gateways 250 are configured to adapt dynamically based on the predefined workload threshold.

According to some examples, the method includes querying the second virtual private cloud by using the first account information to access the second virtual private cloud and using APIs of the CSP to identify resources in the second virtual private cloud at block 1106. For example, controller 210 illustrated in FIG. 2 may query the second virtual private cloud by using the first account information to access the second virtual private cloud and using APIs 222 of the CSP to identify resources in the second virtual private cloud. The resources are collected in the inventory-by-inventory server 232.

According to some examples, the method includes maintaining a mapping of tags to the resources in the inventory at block 1108. For example, controller 210 illustrated in FIG. 2 may maintain a mapping of tags to the resources in the inventory. The tags associate a security policy to a respective resource. Additionally, controller 210 can determine the applicability of a tag within the inventory to one or more regions in the network environment. Upon detecting the presence of the identified tag and identifying that at least one security gateway 250 associated with a respective region lacks an associated security policy linked to the identified tag, controller 210 initiates transmission of an update to the security gateway 250. This update incorporates the identified security policy, ensuring coverage across the network infrastructure.

According to some examples, the method includes forwarding a first subset of the mapping of the tags to the resources in the inventory to a first security gateway in the first virtual private cloud, at block 1110. For example, controller 210 illustrated in FIG. 2 may forward a first subset of the mapping of the tags to the resources in the inventory to a first security gateway 250 in the first virtual private cloud. The first subset of the mapping of the tags to the resources in the inventory includes mappings relevant to the first virtual private cloud. The first security gateway 250 automatically applies a first security policy to a first resource when the first resource is instantiated and is associated with a first tag that maps to the first security policy. Additionally, the first and the second tags can be assigned by an administrator of the account environment through the user interface of controller 210. Additionally, controller 210 can generate a model based on the first tag and the second tag. The model can associate all of the tags with corresponding security policies, where the model can be utilized to enforce assigned security policies on the respective services associated with the tags in the network environment. Controller 210 can further utilize the inventory comprising the assigned tags and the associated network information and reconcile the inventory to enable a user to define security policies in terms of the tags by referencing the generated model, allowing controller 210 to associate services with specific tags and identify services sharing a same tag within the network environment. Controller 210 can further detect from the network information one or more security events at the first security gateway 250 and assign a context to the security events, identifying whether the security events are malicious attacks.

According to some examples, the method includes forwarding a second subset of the mapping of the tags to the resources in the inventory to a second security gateway 250 in the second virtual private cloud at block 1112. For example, controller 210 illustrated in FIG. 2, may forward a second subset of the mapping of the tags to the resources in the inventory to a second security gateway 250 in the second virtual private cloud. The second subset of the mapping of the tags to the resources in the inventory can include mappings relevant to the second virtual private cloud. The security gateway automatically applies a second security policy to a second resource when the second resource is instantiated and is associated with a second tag that maps to the second security policy.

Figure 12:
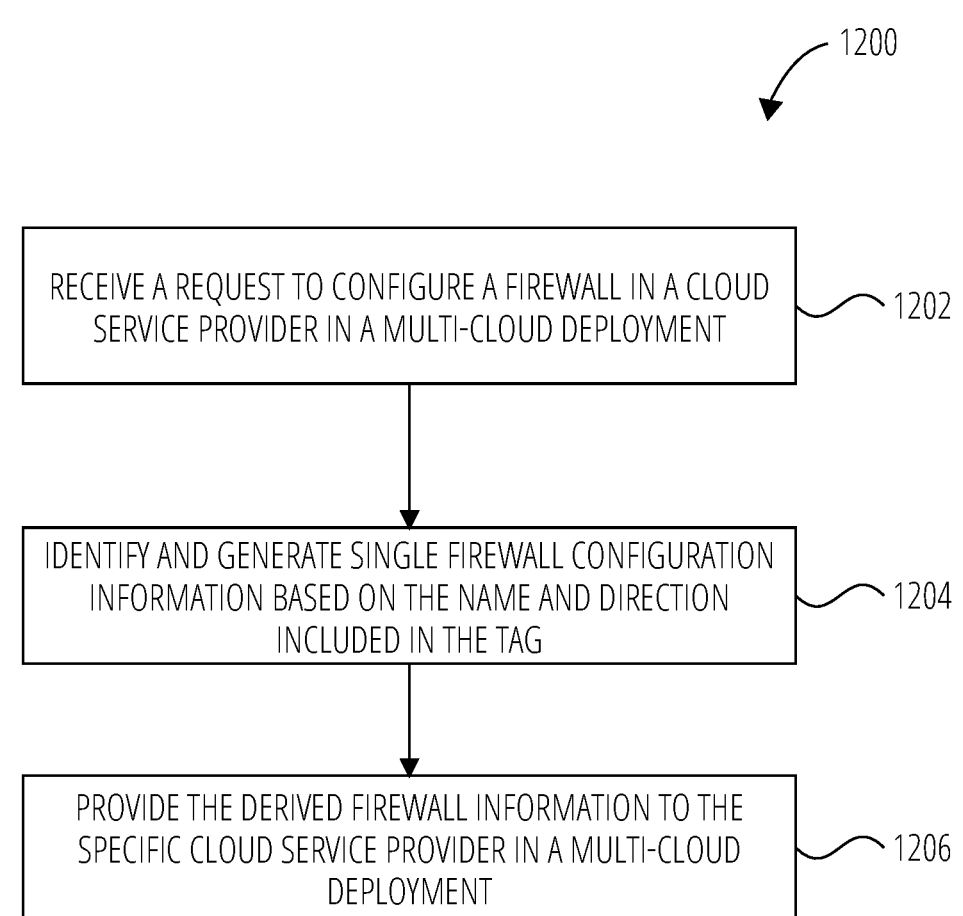
FIG. 12 illustrates an example method for applying a single configuration to firewalls in a multi-cloud firewall deployment in accordance with various aspects of the disclosure.

FIG. 12 illustrates an example method for applying a single configuration to firewalls in a multi-cloud firewall deployment in accordance with some aspects of the disclosure. Although the example method 1200 depicts a particular sequence of operations, the sequence may be altered without departing from the scope of the present disclosure. For example, some of the operations depicted may be performed in parallel or in a different sequence that does not materially affect the function of method 1200. In other examples, different components of an example device or system that implements method 1200 may perform functions at substantially the same time or in a specific sequence. Although a computing device is described as performing the method, this example is for descriptive purposes. The method may be performed in a distributed manner using cloud computing, various containers, microservices, and other techniques. In some aspects, the computing system described in FIG. 13 comprises functionality associated with a controller of the cloud security platform.

In some aspects, the computing system may be a controller (e.g., the controller 210) configured to deploy services and firewalls in a multi-cloud application. The computing system may store single firewall configuration information that can be applied to a plurality of CSPs. As further described below, the computing system can generate derived firewall information for a particular CSP for ingress or egress of network traffic.

At block 1202, the computing system may receive a request to configure a firewall in a CSP. The request includes a tag including a name that identifies a single firewall configuration information. For example, the request can include a firewall name and a tag associated with the direction of network data (e.g., 10.0.2.23-ingress, 10.0.2.23-egress, ingress-valtix-acme-demo.amazonaws.com, etc.).

At block 1204, the computing system may identify the single firewall configuration information based on the name included in the tag and a direction associated with network traffic included in the tag. The single firewall configuration information may include a plurality of configurations for specific cloud configurations or may include a pointer (or a weak reference) to the plurality of configurations for specific cloud configurations. A specific cloud configuration includes information that is uniquely associated with a specific cloud and can include, for example, a login credential to allow the computing system to send instructions to the corresponding cloud, VPC information associated with assets (e.g., a load balancer, etc.) in the CSP, virtual network information, etc.

The computing system may generate derived firewall information from the single firewall configuration information based on the identity of the CSP and the tag. For example, the private cloud information can remove information stored in the single firewall configuration information and apply the specific network configuration to the derived firewall information at the time of the request. That is, the computing system is configured to generate a firewall configuration of a specific CSP at runtime. Abstracting the CSP-specific information (e.g., VPC info, account credentials, etc.) reduces the number of configurations that an administrator maintains and guarantees consistent firewall configuration between CSPs.

For example, the derived firewall information comprises ingress information for an ingress firewall configured for the service in the CSP or egress information for an egress firewall configured for the service in the CSP. The single firewall configuration information comprises at least one of address information of an ingress firewall for each of a plurality of CSPs and address information of an egress firewall for each of the plurality of CSPs.

The derived firewall information comprises address information of at least one firewall that is formatted according to an address requirement of the CSP. For example, each CSP can include different network configurations (e.g., IPv4, IPv6, FQDNs, etc.) that are specific. These configurations are similar but may require additional parameters or slight variations. The derived firewall information comprises credential information for accessing the CSP and configuring the firewall.

At block 1206, the computing system may provide the derived firewall information to the specific CSP. As described above, the derived firewall information is generated at runtime from the single firewall configuration information based on an identity of the CSP and the tag. The single firewall configuration information includes network information for connecting the firewall to a private network in each corresponding CSP.

In some aspects, the request is provided in response to an external notice from at least one third-party service. For example, the request can be provided by an autonomous security service that provides notifications and corrections to security incidents. In other aspects, the request is provided by a user of a multi-cloud cloud security platform that controls resources distributed in multiple CSPs. For example, an administrator may reconfigure a firewall to include new rules. In response to the new rules, the administrator may push the reconfigured firewall setting out to each CSP.

Figure 13:
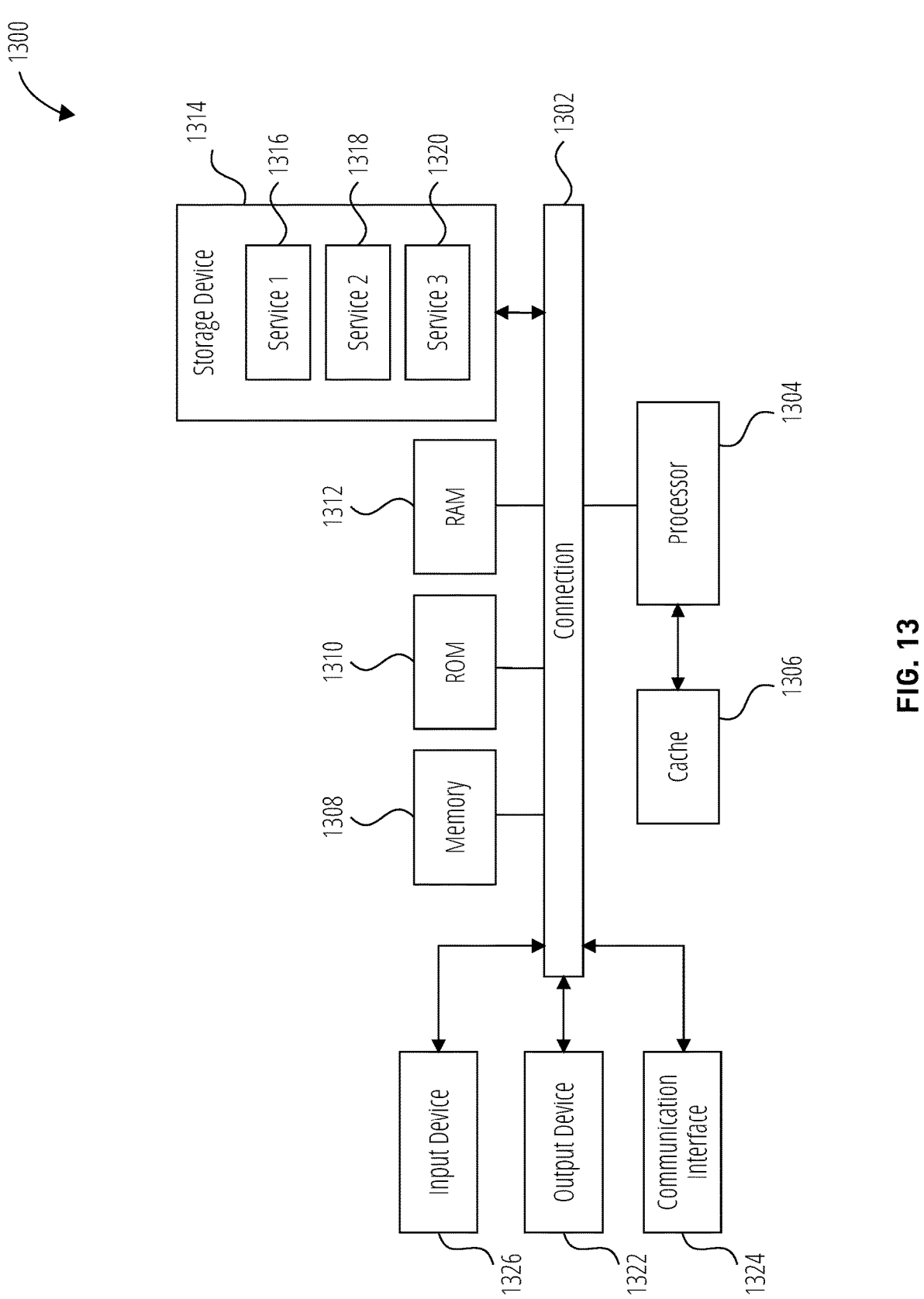
FIG. 13 shows an example of a computing system, which may be for example any computing device that may implement components of the system in accordance with various aspects of the disclosure.

FIG. 13 illustrates an example of computing system 1300, which can be for example any computing device making up a gateway, a controller, a DP agent, a DP worker, or any component thereof in which the components of the system are in communication with each other using connection 1302. Connection 1302 can be a physical connection via a bus, or a direct connection into processor 1304, such as in a chipset architecture. Connection 1302 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1300 includes at least one processing unit (CPU or processor) and connection 1302 that couples various system components including system memory 1308, such as read-only memory (ROM) 1310 and random-access memory (RAM) 1312 to processor 1304. Computing system 1300 can include a cache 1306 of high-speed memory 1308 connected directly with, in close proximity to, or integrated as part of processor 1304.

Processor 1304 can include any general-purpose processor and a hardware service or software service, such as services 1316, 1318, and 1320, stored in storage device 1314, configured to control processor 1304 as well as a special-purpose processor where software instructions are incorporated into the actual processor design. Processor 1304 may essentially be a completely self-contained computing system, containing multiple cores or processors, a bus, memory controller, cache, etc. A multi-core processor may be symmetric or asymmetric.

To enable user interaction, computing system 1300 includes an input device 1326, which can represent any number of input mechanisms, such as a microphone for speech, a touch-sensitive screen for gesture or graphical input, keyboard, mouse, motion input, speech, etc. Computing system 1300 can also include output device 1322, which can be one or more of a number of output mechanisms known to those of skill in the art. In some instances, multimodal systems can enable a user to provide multiple types of input/output to communicate with computing system 1300. Computing system 1300 can include communication interface 1324, which can generally govern and manage the user input and system output. There is no restriction on operating on any particular hardware arrangement, and therefore the basic features here may easily be substituted for improved hardware or firmware arrangements as they are developed.

Storage device 1314 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1314 can include software services, servers, services, etc., that when the code that defines such software is executed by the processor 1304, it causes the system to perform a function. In some embodiments, a hardware service that performs a particular function can include the software component stored in a computer-readable medium in connection with the necessary hardware components, such as processor 1304, connection 1302, output device 1322, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory 1308 of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s).

The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, graphical processing units (GPUs), digital signal processors (DSPs), CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random-access memory (SDRAM), ROM, non-volatile random-access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an ASIC, FPGAs, or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly, the term "processor," as used herein may refer to any of the foregoing structure, any combination of the foregoing structure, or any other structure or apparatus suitable for implementation of the techniques described herein.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some clauses of the present technology include:

Clause 1. A method for configuring resources of a service distributed across multiple cloud service providers, comprising: receiving a request to configure a firewall in a cloud service provider, the request including a tag including a name that identifies a single firewall configuration information; and providing derived firewall information from the single firewall configuration information based on an identity of the cloud service provider and the tag, wherein the single firewall configuration information includes network information for connecting the firewall to a private network in the cloud service provider.

Clause 2. The method of clause 1, wherein the derived firewall information comprises ingress information for an ingress firewall configured for the service in the cloud service provider or egress information for an egress firewall configured for the service in the cloud service provider.

Clause 3. The method of clause 1, further comprising: identifying the single firewall configuration information based on the name included in the tag and a direction associated with network traffic included in the tag.

Clause 4. The method of clause 3, wherein the single firewall configuration information comprises at least one of address information of an ingress firewall for each of a plurality of cloud service providers and address information of an egress firewall for each of the plurality of cloud service providers.

Clause 5. The method of clause 1, wherein the derived firewall information comprises address information of at least one firewall that is formatted according to an address requirement of the cloud service provider.

Clause 6. The method of clause 1, wherein the derived firewall information comprises credential information for accessing the cloud service provider and configuring the firewall.

Clause 7. The method of clause 1, wherein the request is provided by a user of a multi-cloud security platform that controls resources distributed in the multiple cloud service providers.

Clause 8. The method of clause 1, wherein the request is provided in response to an external notice from at least one third-party service.

Clause 9. An apparatus for configuring resources of a service distributed across multiple cloud service providers, comprising: a storage configured to store instructions; and a processor configured to execute the instructions and cause the processor to: receive a request to configure a firewall in a cloud service provider, the request including a tag including a name that identifies a single firewall configuration information; and provide derived firewall information from the single firewall configuration information based on an identity of the cloud service provider and the tag, wherein the single firewall configuration information includes network information for connecting the firewall to a private network in the cloud service provider.

Clause 10. The apparatus of clause 9, wherein the derived firewall information comprises ingress information for an ingress firewall configured for the service in the cloud service provider or egress information for an egress firewall configured for the service in the cloud service provider.

Clause 11. The apparatus of clause 9, wherein the processor is configured to: identify the single firewall configuration information based on the name included in the tag and a direction associated with network traffic included in the tag.

Clause 12. The apparatus of clause 11, wherein the single firewall configuration information comprises at least one of address information of an ingress firewall for each of a plurality of cloud service providers and address information of an egress firewall for each of the plurality of cloud service providers.

Clause 13. The apparatus of clause 9, wherein the derived firewall information comprises address information of at least one firewall that is formatted according to an address requirement of the cloud service provider.

Clause 14. The apparatus of clause 9, wherein the derived firewall information comprises credential information for accessing the cloud service provider and configuring the firewall.

Clause 15. The apparatus of clause 9, wherein the request is provided by a user of a multi-cloud security platform that controls resources distributed in the multiple cloud service providers.

Clause 16. The apparatus of clause 9, wherein the request is provided in response to an external notice from at least one third-party service.

Clause 17. A non-transitory computer readable medium comprising instructions, the instructions, when executed by a computing system, cause the computing system to: receive a request to configure a firewall in a cloud service provider, the request including a tag including a name that identifies a single firewall configuration information; and provide derived firewall information from the single firewall configuration information based on an identity of the cloud service provider and the tag, wherein the single firewall configuration information includes network information for connecting the firewall to a private network in the cloud service provider.

Clause 18. The computer readable medium of clause 17, wherein the derived firewall information comprises ingress information for an ingress firewall configured for the service in the cloud service provider or egress information for an egress firewall configured for the service in the cloud service provider.

Clause 19. The computer readable medium of clause 17, wherein the computer readable medium further comprises instructions that, when executed by the computing system, cause the computing system to: identify the single firewall configuration information based on the name included in the tag and a direction associated with network traffic included in the tag.

Clause 20. The computer readable medium of clause 19, wherein the single firewall configuration information comprises at least one of address information of an ingress firewall for each of a plurality of cloud service providers and address information of an egress firewall for each of the plurality of cloud service providers.

Clause 21. A method for inventory monitoring in a multi-cloud network environment, the method comprising: receiving a user input in a user interface of a controller, wherein the user input includes first account information providing access to the controller to a first virtual private cloud and a second virtual private cloud, wherein the first virtual private cloud and second virtual private cloud are hosted by a cloud service provider (CSP); querying, by the controller, the first virtual private cloud by using the first account information to access the first virtual private cloud and using Application Programming Interfaces (APIs) of the CSP to identify resources in the first virtual private cloud, wherein the resources are collected in an inventory; querying, by the controller, the second virtual private cloud using the first account information to access the second virtual private cloud and using Application Programming Interfaces (APIs) of the CSP to identify resources in the second virtual private cloud, wherein the resources are collected in the inventory; maintaining, by the controller, a mapping of tags to the resources in the inventory, the tags associate a security policy to a respective resource; forwarding, by the controller, a first subset of the mapping of the tags to the resources in the inventory to a first security gateway in the first virtual private cloud, wherein the first subset of the mapping of the tags to the resources in the inventory includes mappings relevant to the first virtual private cloud, wherein the first security gateway automatically applies a first security policy to a first resource when the first resource is instantiated and is associated with a first tag that maps to the first security policy; and forwarding, by the controller, a second subset of the mapping of the tags to the resources in the inventory to a second security gateway in the second virtual private cloud, wherein the second subset of the mapping of the tags to the resources in the inventory includes mappings relevant to the second virtual private cloud, wherein the security gateway automatically applies a second security policy to a second resource when the second resource is instantiated and is associated with a second tag that maps to the second security policy.

Clause 22. The method of clause 21, wherein the first and the second tag are assigned by an administrator of the account environment through the user interface of the controller.

Clause 23. The method of clause 21, wherein the CSP comprises of a plurality of CSPs, the CSPs comprising one or more different subsets of resources.

Clause 24. The method of clause 21, wherein the controller is configured to communicate with the first security gateway in the first virtual private cloud, and the second security gateway in the second virtual private cloud.

Clause 25. The method of clause 21, further comprising: generating, by the controller, a model based on the first tag and the second tag, wherein the model associates all of the tags with corresponding security policies, and wherein the security gateway utilizes this model to enforce assigned security policies on the respective services associated with the tags in the network environment.

Clause 26. The method of clause 25, wherein the controller utilizes the inventory comprising the assigned tags and the associated network information and reconciles the inventory to enable a user to define security policies in terms of the tags by referencing the generated model, allowing the controller to associate services with specific tags and identify services sharing a same tag within the network environment.

Clause 27. The method of clause 21, wherein a plurality of predefined attributes is associated with one or more user-defined workload associations applicable to the CSP.

Clause 28. The method of clause 21, wherein the inventory provides visibility into one or more services and their associated tags associated with the CSP.

Clause 29. The method of clause 21, further comprising: monitoring, at the controller, a workload associated with the monitoring of one or more services at the CSP; and upon detecting that a predefined threshold workload is met, generating a plurality of additional CSPs to assist with the monitoring of the one or more services, a number of the additional CSPs configured to dynamically adjust based on the predefined threshold.

Clause 30. The method of clause 21, further comprising: detecting from the network information one or more security events at the security gateway; and assigning a context to the security events identifying whether the security events is a malicious attack.

Clause 31. The method of clause 21, further comprising: determining, by the controller, an applicability of a tag within the inventory to one or more regions in the network environment; and upon identification that at least one security gateway associated with a respective region lacks an identified security policy linked to the identified tag, transmitting, by the controller, an update to the security gateway, incorporating the identified security policy.

Clause 32. A network device comprising: a processor; and a memory storing instructions that, when executed by the processor, configure the network device to: receive a user input in a user interface of a controller, wherein the user input includes first account information providing access to the controller to a first virtual private cloud and a second virtual private cloud, wherein the first virtual private cloud and second virtual private cloud are hosted by a cloud service provider (CSP); query, by the controller, the first virtual private cloud by using the first account information to access the first virtual private cloud and using Application Programming Interfaces (APIs) of the CSP to identify resources in the first virtual private cloud, wherein the resources are collected in an inventory; query, by the controller, the second virtual private cloud using the first account information to access the second virtual private cloud and using Application Programming Interfaces (APIs) of the CSP to identify resources in the second virtual private cloud, wherein the resources are collected in the inventory; maintain, by the controller, a mapping of tags to the resources in the inventory, the tags associate a security policy to a respective resource; forward, by the controller, a first subset of the mapping of the tags to the resources in the inventory to a first security gateway in the first virtual private cloud, wherein the first subset of the mapping of the tags to the resources in the inventory includes mappings relevant to the first virtual private cloud, wherein the first security gateway automatically applies a first security policy to a first resource when the first resource is instantiated and is associated with a first tag that maps to the first security policy; and forward, by the controller, a second subset of the mapping of the tags to the resources in the inventory to a second security gateway in the second virtual private cloud, wherein the second subset of the mapping of the tags to the resources in the inventory includes mappings relevant to the second virtual private cloud, wherein the security gateway automatically applies a second security policy to a second resource when the second resource is instantiated and is associated with a second tag that maps to the second security policy.

Clause 33. The network device of clause 32, wherein the first and the second tag are assigned by an administrator of an account environment through the user interface of the controller.

Clause 34. The network device of clause 32, wherein the CSP comprises of a plurality of CSPs, the CSPs comprising one or more different subsets of resources.

Clause 35. The network device of clause 32, wherein the controller is configured to communicate with the first security gateway in the first virtual private cloud, and the second security gateway in the second virtual private cloud.

Clause 36. The network device of clause 32, wherein the instructions further configure the network device to: generate, by the controller, a model based on the first tag and the second tag, wherein the model associates all of the tags with corresponding security policies, and wherein the security gateway utilizes this model to enforce assigned security policies on the respective services associated with the tags in a network environment.

Clause 37. The network device of clause 32, wherein a plurality of predefined attributes is associated with one or more user-defined workload associations applicable to the CSP.

Clause 38. The network device of clause 32, wherein the inventory provides visibility into one or more services and their associated tags associated with the CSP.

Clause 39. The network device of clause 32, wherein the instructions further configure the network device to: monitor, at the controller, a workload associated with the monitoring of one or more services at the CSP; and upon detecting that a predefined threshold workload is met, generate a plurality of additional CSPs to assist with the monitoring of the one or more services, a number of the additional CSPs configured to dynamically adjust based on the predefined threshold.

Clause 40. The network device of clause 32, wherein the instructions further configure the network device to: detect from the network information one or more security events at the security gateway; and assign a context to the security events identifying whether the security events is a malicious attack.

Clause 41. The network device of clause 32, wherein the instructions further configure the network device to: determine, by the controller, an applicability of a tag within the inventory to one or more regions in a network environment; and upon identification that at least one security gateway associated with a respective region lacks an identified security policy linked to the identified tag, transmit, by the controller, an update to the security gateway, incorporating the identified security policy.

Clause 42. A non-transitory computer readable medium comprising instructions, the instructions, when executed by a computing system, cause the computing system to: receive a user input in a user interface of a controller, wherein the user input includes first account information providing access to the controller to a first virtual private cloud and a second virtual private cloud, wherein the first virtual private cloud and second virtual private cloud are hosted by a cloud service provider (CSP); query, by the controller, the first virtual private cloud by using the first account information to access the first virtual private cloud and using Application Programming Interfaces (APIs) of the CSP to identify resources in the first virtual private cloud, wherein the resources are collected in an inventory; query, by the controller, the second virtual private cloud using the first account information to access the second virtual private cloud and using Application Programming Interfaces (APIs) of the CSP to identify resources in the second virtual private cloud, wherein the resources are collected in the inventory; maintain, by the controller, a mapping of tags to the resources in the inventory, the tags associate a security policy to a respective resource; forward, by the controller, a first subset of the mapping of the tags to the resources in the inventory to a first security gateway in the first virtual private cloud, wherein the first subset of the mapping of the tags to the resources in the inventory includes mappings relevant to the first virtual private cloud, wherein the first security gateway automatically applies a first security policy to a first resource when the first resource is instantiated and is associated with a first tag that maps to the first security policy; and forward, by the controller, a second subset of the mapping of the tags to the resources in the inventory to a second security gateway in the second virtual private cloud, wherein the second subset of the mapping of the tags to the resources in the inventory includes mappings relevant to the second virtual private cloud, wherein the security gateway automatically applies a second security policy to a second resource when the second resource is instantiated and is associated with a second tag that maps to the second security policy.

Clause 43. The non-transitory computer-readable medium of clause 42, wherein the first and the second tags are assigned by an administrator of an account environment through the user interface of the controller.

Clause 44. The non-transitory computer-readable medium of clause 42, wherein the controller is configured to communicate with the first security gateway in the first virtual private cloud, and the second security gateway in the second virtual private cloud.

Clause 45. The non-transitory computer-readable medium of clause 42, wherein the controller is configured to communicate with the first security gateway in the first virtual private cloud, and the second security gateway in the second virtual private cloud.

Clause 46. The non-transitory computer-readable medium of clause 42, wherein the non-transitory computer-readable medium further comprises instructions that, when executed by the computing system, cause the computing system to: generate, by the controller, a model based on the first tag and the second tag, wherein the model associates all of the tags with corresponding security policies, and wherein the security gateway utilizes this model to enforce assigned security policies on the respective services associated with the tags in a network environment.

What is claimed is:

1. A method for inventory monitoring in a multi-cloud network environment, the method comprising:
   receiving a user input in a user interface of a controller, wherein the user input includes first account information providing access to the controller to a first virtual private cloud and a second virtual private cloud, wherein the first virtual private cloud and the second virtual private cloud are hosted by a cloud service provider (CSP);
   querying, by the controller, the first virtual private cloud by using the first account information to access the first virtual private cloud and using Application Programming Interfaces (APIs) of the CSP to identify resources in the first virtual private cloud, wherein the resources are collected in an inventory;
   querying, by the controller, the second virtual private cloud using the first account information to access the second virtual private cloud and using the APIs of the CSP to identify resources in the second virtual private cloud, wherein the resources are collected in the inventory;
   maintaining, by the controller, a mapping of tags to the resources in the inventory, the tags associate a security policy to a respective resource;
   forwarding, by the controller, a first subset of the mapping of the tags to the resources in the inventory to a first security gateway in the first virtual private cloud, wherein the first subset of the mapping of the tags to the resources in the inventory includes mappings relevant to the first virtual private cloud, wherein the first security gateway automatically applies a first security policy to a first resource when the first resource is instantiated and is associated with a first tag that maps to the first security policy; and
   forwarding, by the controller, a second subset of the mapping of the tags to the resources in the inventory to a second security gateway in the second virtual private cloud, wherein the second subset of the mapping of the tags to the resources in the inventory includes mappings relevant to the second virtual private cloud, wherein the second security gateway automatically applies a second security policy to a second resource when the second resource is instantiated and is associated with a second tag that maps to the second security policy.

2. The method of claim 1, wherein the tags are assigned by an administrator of the multi-cloud network environment through the user interface of the controller.

3. The method of claim 1, wherein the CSP comprises of a plurality of CSPs, the CSPs comprising one or more different subsets of resources.

4. The method of claim 1, wherein the controller is configured to communicate with the first security gateway in the first virtual private cloud, and the second security gateway in the second virtual private cloud.

5. The method of claim 1, further comprising:
   generating, by the controller, a model based on the first tag and the second tag, wherein the model associates all of the tags with corresponding security policies, and wherein the first security gateway utilizes the model to enforce assigned security policies on respective resources associated with the tags in the multi-cloud network environment.

6. The method of claim 5, wherein the controller utilizes the inventory comprising assigned tags and associated network information and reconciles the inventory to enable a user to define security policies in terms of the tags by referencing the model, allowing the controller to associate services with specific tags and identify services sharing a same tag within the multi-cloud network environment.

7. The method of claim 1, further comprising:
   monitoring, at the controller, a workload associated with the monitoring of one or more services associated with the resources at the CSP; and
   upon detecting that a predefined threshold workload is met, generating a plurality of additional CSPs to assist with the monitoring of the one or more services, a number of the additional CSPs configured to dynamically adjust based on the predefined threshold workload.

8. The method of claim 1, further comprising:

detecting, from network information, one or more security events at the first security gateway; and assigning a context to the one or more security events identifying whether the one or more security events is a malicious attack.

9. The method of claim 1, further comprising:

determining, by the controller, an applicability of a third tag within the inventory to one or more regions in the multi-cloud network environment; and upon identification that at least one security gateway associated with a respective region lacks an identified security policy linked to the third tag, transmitting, by the controller, an update to the at least one security gateway, incorporating the identified security policy.

10. A network device comprising:

a processor; and a memory storing instructions that, when executed by the processor, configure the network device to:

receive a user input in a user interface of a controller, wherein the user input includes first account information providing access to the controller to a first virtual private cloud and a second virtual private cloud, wherein the first virtual private cloud and the second virtual private cloud are hosted by a cloud service provider (CSP);

query, by the controller, the first virtual private cloud by using the first account information to access the first virtual private cloud and using Application Programming Interfaces (APIs) of the CSP to identify resources in the first virtual private cloud, wherein the resources are collected in an inventory;

query, by the controller, the second virtual private cloud using the first account information to access the second virtual private cloud and using the APIs of the CSP to identify resources in the second virtual private cloud, wherein the resources are collected in the inventory;

maintain, by the controller, a mapping of tags to the resources in the inventory, the tags associate a security policy to a respective resource;

forward, by the controller, a first subset of the mapping of the tags to the resources in the inventory to a first security gateway in the first virtual private cloud, wherein the first subset of the mapping of the tags to the resources in the inventory includes mappings relevant to the first virtual private cloud, wherein the first security gateway automatically applies a first security policy to a first resource when the first resource is instantiated and is associated with a first tag that maps to the first security policy; and forward, by the controller, a second subset of the mapping of the tags to the resources in the inventory to a second security gateway in the second virtual private cloud, wherein the second subset of the mapping of the tags to the resources in the inventory includes mappings relevant to the second virtual private cloud, wherein the second security gateway automatically applies a second security policy to a second resource when the second resource is instantiated and is associated with a second tag that maps to the second security policy.

11. The network device of claim 10, wherein the first and the second tag are assigned by an administrator of a multi-cloud network environment through the user interface of the controller.

12. The network device of claim 10, wherein the CSP comprises of a plurality of CSPs, the CSPs comprising one or more different subsets of resources.

13. The network device of claim 10, wherein the controller is configured to communicate with the first security gateway in the first virtual private cloud, and the second security gateway in the second virtual private cloud.

14. The network device of claim 10, wherein the instructions further configure the network device to:

generate, by the controller, a model based on the first tag and the second tag, wherein the model associates all of the tags with corresponding security policies, and wherein the first security gateway utilizes this model to enforce assigned security policies on respective services associated with the tags in a multi-cloud network environment.

15. The network device of claim 10, wherein the instructions further configure the network device to:

detect, from network information, one or more security events at the first security gateway; and assign a context to the one or more security events identifying whether the one or more security events is a malicious attack.

16. A non-transitory computer readable medium comprising instructions, the instructions, when executed by a computing system, cause the computing system to:

receive a user input in a user interface of a controller, wherein the user input includes first account information providing access to the controller to a first virtual private cloud and a second virtual private cloud, wherein the first virtual private cloud and the second virtual private cloud are hosted by a cloud service provider (CSP);

query, by the controller, the first virtual private cloud by using the first account information to access the first virtual private cloud and using Application Programming Interfaces (APIs) of the CSP to identify resources in the first virtual private cloud, wherein the resources are collected in an inventory;

query, by the controller, the second virtual private cloud using the first account information to access the second virtual private cloud and using the APIs of the CSP to identify resources in the second virtual private cloud, wherein the resources are collected in the inventory;

maintain, by the controller, a mapping of tags to the resources in the inventory, the tags associate a security policy to a respective resource;

forward, by the controller, a first subset of the mapping of the tags to the resources in the inventory to a first security gateway in the first virtual private cloud, wherein the first subset of the mapping of the tags to the resources in the inventory includes mappings relevant to the first virtual private cloud, wherein the first security gateway automatically applies a first security policy to a first resource when the first resource is instantiated and is associated with a first tag that maps to the first security policy; and forward, by the controller, a second subset of the mapping of the tags to the resources in the inventory to a second security gateway in the second virtual private cloud, wherein the second subset of the mapping of the tags to the resources in the inventory includes mappings relevant to the second virtual private cloud, wherein the second security gateway automatically applies a second security policy to a second resource when the second resource is instantiated and is associated with a second tag that maps to the second security policy.

17. The non-transitory computer readable medium of claim 16, wherein the first and the second tag are assigned by an administrator of a multi-cloud network environment through the user interface of the controller.

18. The non-transitory computer readable medium of claim 16, wherein the controller is configured to communicate with the first security gateway in the first virtual private cloud, and the second security gateway in the second virtual private cloud.

19. The non-transitory computer readable medium of claim 16, further comprising instructions that, when executed by the computing system, cause the computing system to:

generate, by the controller, a model based on the first tag and the second tag, wherein the model associates all of the tags with corresponding security policies, and wherein the first security gateway utilizes the model to enforce assigned security policies on respective services associated with the tags in a multi-cloud network environment.

20. The non-transitory computer readable medium of claim 19, wherein the controller utilizes the inventory comprising assigned tags and associated network information and reconciles the inventory to enable a user to define security policies in terms of the tags by referencing the model, allowing the controller to associate services with specific tags and identify services sharing a same tag within the multi-cloud network environment.

\* \* \* \* \*